US011784850B2

(12) United States Patent
Graham, III et al.

(10) Patent No.: US 11,784,850 B2
(45) Date of Patent: *Oct. 10, 2023

(54) HIGH-SPEED WIRELESS MULTI-PATH DATA NETWORK

(71) Applicant: AirVine Scientific, Inc., Bella Vista, CA (US)

(72) Inventors: Hatch Graham, III, Bella Vista, CA (US); Harry William Peterson, Concord, CA (US)

(73) Assignee: AIRVINE SCIENTIFIC, INC., Bella Vista, CA (US)

( * ) Notice: Subject to any disclaimer, the term of this patent is extended or adjusted under 35 U.S.C. 154(b) by 560 days.

This patent is subject to a terminal disclaimer.

(21) Appl. No.: 15/955,136

(22) Filed: Apr. 17, 2018

(65) Prior Publication Data

US 2018/0302238 A1 Oct. 18, 2018

Related U.S. Application Data

(60) Provisional application No. 62/486,376, filed on Apr. 17, 2017.

(51) Int. Cl.
*H04L 12/00* (2006.01)
*H04L 12/437* (2006.01)
(Continued)

(52) U.S. Cl.
CPC .......... *H04L 12/437* (2013.01); *H04L 9/0819* (2013.01); *H04L 9/0841* (2013.01);
(Continued)

(58) Field of Classification Search
None
See application file for complete search history.

(56) References Cited

U.S. PATENT DOCUMENTS 6,016,313 A  1/2000 Foster, Jr.
7,065,350 B2 6/2006 Capobianco et al.
(Continued)

FOREIGN PATENT DOCUMENTS

EP  1 434 393 A2  6/2004
EP    3133847 A1  2/2017

OTHER PUBLICATIONS

K. Loshokov, PCT Search Report and Written Opinion of the International Searching Authority, Intl. Appl. No. PCT/US2018/019939, dated Nov. 15, 2018, 7 pages.
(Continued)

*Primary Examiner* — Noel R Beharry
*Assistant Examiner* — Lionel Preval
(74) *Attorney, Agent, or Firm* — GAVRILOVICH, DODD + LINDSEY LLP

(57) ABSTRACT

A communication network includes nodes configured into a wireless ring network operating at one or more millimeter-wave frequencies. At least one of the nodes is configured to send and receive millimeter-wave wireless signals through an obstruction. In accordance with an exemplary embodiment of the network, one or more of the nodes may include small, phased-array antennas and transceivers, configured with radio electronics to mitigate the path loss through certain obstructions, such as walls, floors, ceilings, and other barriers within buildings, as well as attenuation from free-space path-loss, including moisture in air (humidity). The network may include multiple pairs of nodes to form one or more wireless communication paths through various obstructions. This may allow a high-speed, wireless, multi-ring network to be established, for example, within a structure, such as a building, without requiring additional cabling or wiring.

20 Claims, 23 Drawing Sheets

(51) Int. Cl.
  *H04L 41/12* (2022.01)
  *H04L 41/06* (2022.01)
  *H04L 9/08* (2006.01)
  *H04L 9/14* (2006.01)
  *H04L 12/46* (2006.01)
  *H04W 12/0471* (2021.01)
  *H04W 72/0453* (2023.01)
  *H04W 84/12* (2009.01)
  *H04W 4/80* (2018.01)
  *H04W 12/03* (2021.01)

(52) U.S. Cl.
  CPC ............ *H04L 9/14* (2013.01); *H04L 12/4633* (2013.01); *H04L 41/06* (2013.01); *H04L 41/12* (2013.01); *H04W 12/0471* (2021.01); *H04W 4/80* (2018.02); *H04W 12/03* (2021.01); *H04W 72/0453* (2013.01); *H04W 84/12* (2013.01)

(56) References Cited

U.S. PATENT DOCUMENTS

| | | | |
|---|---|---|---|
| 10,897,082 B1* | 1/2021 | Legare | H01Q 3/2694 |
| 2003/0157908 A1* | 8/2003 | Dalal | H04B 1/525 455/129 |
| 2004/0110469 A1 | 6/2004 | Judd et al. | |
| 2004/0174900 A1 | 9/2004 | Volpi et al. | |
| 2010/0231452 A1 | 9/2010 | Babakhani et al. | |
| 2011/0038356 A1 | 2/2011 | Bachrach | |
| 2011/0183690 A1 | 7/2011 | Kobayakawa | |
| 2011/0300885 A1 | 12/2011 | Darabi et al. | |
| 2012/0135724 A1 | 5/2012 | Lewis et al. | |
| 2014/0071812 A1* | 3/2014 | Pao | H04L 41/0654 370/223 |
| 2014/0092803 A1 | 4/2014 | Picker | |
| 2014/0376431 A1 | 12/2014 | Li | |
| 2015/0382258 A1 | 12/2015 | Schmidt | |
| 2016/0037431 A1 | 2/2016 | Kohli | |
| 2016/0057585 A1 | 2/2016 | Horn | |
| 2016/0112970 A1 | 4/2016 | Chen et al. | |
| 2016/0134356 A1* | 5/2016 | Rappaport | H04W 16/26 370/315 |
| 2016/0233580 A1 | 8/2016 | Aparin et al. | |
| 2017/0098889 A1 | 4/2017 | Henry et al. | |
| 2017/0195054 A1* | 7/2017 | Ashrafi | H04B 10/40 |
| 2018/0262272 A1* | 9/2018 | Ashrafi | H04L 25/03343 |
| 2018/0331829 A1* | 11/2018 | Wang | H04L 9/3242 |

OTHER PUBLICATIONS

T. Vladimirova, PCT Search Report and Written Opinion of the International Searching Authority, Intl. Appl. No. PCT/US2018/019931, dated Jun. 28, 2018, 7 pages.

Z. Nabieva, PCT Search Repod and Written Opinion of the International Searching Authority, Intl. Appl. No. PCT/US2018/022422, dated Jun. 21, 2018, 6 pages.

Robert E. Wallis et al., "Tesing of the Messenger Spacecraft Phased-Array Antenna," IEEE Antennas and PRopagation Magazine, Vo. 47, Issue 1, pp. 204-209, Jul. 18, 2005.

T. Ivanova, PCT Search Report and Written Opinion of the International Searching Authority, Intl. Appl. No. PCT/US2018/027946, dated Jul. 9, 2018, 7 pages.

Christopher R. Anderson et al., "In-Building Wideband Partition Loss Measurements at 2.5 GHz and 60 GHz," IEEE Transactions on Wireless Communications, vol. 3, pp. 922-928, May 2004.

Hang Zhao et al., "28 GHz Millimeter Wave Cellular Communication Measurements for Reflection and Penetration Loss in and around Buildings in New York City," IEEE ICC 2013—Wireless Communications Symposium, Jul. 2013, pp. 5163-5167.

Tommaso Cella et al., "MM-Wave Short Range Outdoor Links With Phased Arrays," ISCCSP 2014, Mar. 2014, pp. 214-217.

Joongheon Kim, "Fast Millimeter-Wave Beam Training with Receive Beamforming," Journal of Communications and Networks, vol. 16, No. 5, Oct. 2014, pp. 512-522.

Chang Cao et al., "Propagation Characteristic for Indoor E-Band Wideband Channels," 2016 IEEE Globecom Workshops, Jul. 2016.

"Multiple Gigabit Wireless Systems in Frequencies Around 60 GHz," Report ITU-R M.2227, International Telecommunication Union, Nov. 2011, 27 pages.

EP Search Report in counter-part EPO application, dated Dec. 14, 2020.

* cited by examiner

HIGH-SPEED WIRELESS MULTI-PATH DATA NETWORK

CROSS REFERENCE TO RELATED APPLICATIONS

This Application claims the benefit of U.S. Provisional Patent Application Ser. No. 62/482,376, filed on Apr. 17, 2017, entitled "Extremely High Speed, Multi-Path Data Network," which is incorporated by reference herein in its entirety. This Application is also related to U.S. patent application Ser. No. 15/906,148, entitled "High Speed Wireless Data Network,", filed Feb. 27, 2018, which is incorporated by reference herein in its entirety; this Application is also related to U.S. patent application Ser. No. 15/906,161, entitled "Millimeter Wave Communications Through Obstructions,", filed Feb. 27, 2018, which is incorporated by reference herein in its entirety; and this Application is also related to U.S. patent application Ser. No. 15/921,098, entitled "Millimeter Wave Communication System Featuring Adjustable Support," filed Mar. 14, 2018, which is incorporated by reference herein in its entirety.

TECHNICAL FIELD

This disclosure generally relates to wireless communications, and more particularly, to wireless communication networks capable of operating in the millimeter wave spectrum.

BACKGROUND

The millimeter wave spectrum is the frequency band of spectrum between 30 GHz and 300 GHz. This spectrum can be used for high-speed wireless communications as seen with the latest IEEE 802.11ad Wi-Fi standard (operating at 60 GHz).

V-Band is a set of millimeter wave frequencies used for communication. Regulatory authorities in some countries permit unlicensed V-Band operation. The set of frequencies over which unlicensed V-Band operation is permitted in the U.S. is currently 57 to 71 GHz. Standards applicable to V-Band communications include IEEE 802.11ad (released 28 Dec. 2012) and IEEE 802.11ay (currently under development).

E-Band is another set of millimeter wave frequencies usable for communication. Regulatory authorities, e.g., the Federal Communications Commission (FCC), generally permit lightly-licensed operation in this band. In the U.S., E-Band operation is permitted in the following frequency bands of 71-76, 81-86, and 92-95 GHz.

The FCC also regulates numerous other unlicensed bands, including Industrial, Scientific, and Medical (ISM) bands at approximately 2 GHz and 6 GHz and other frequencies. In recent years, some of the fastest-growing uses of the ISM bands and other lightly licensed or unlicensed bands have been for short-range, low-power wireless communications systems, referred to commonly as WiFi.

A problem with some wireless networks, particularly those operating at millimeter wave frequencies, is the ability for wireless signals to penetrate obstructions, such as walls, ceilings, or floors within buildings or other barriers. Although millimeter-wave signals can and do pass through some obstructions, they are often degraded by doing so. Degradation may be due to attenuation, reflection and other physical processes caused by the obstruction. As frequency of transmission increases, attenuation by obstacles and free space also increases. The result is a reduction of received power, thereby limiting signal range and ability to penetrate obstructions.

It is desirable that high-speed wireless networks operate successfully within buildings and other environments where obstructions and free space distances may present potential limitations. It is also desirable that such networks operate reliably and securely.

SUMMARY

Disclosed herein is a wireless network that includes at least a pair of nodes that are configured to communicate with each other by transmitting and receiving one or more millimeter-wave beams through an obstruction. The nodes are configured into a wireless ring (loop) network operating at one or more millimeter-wave frequencies.

Also disclosed is a method of wireless communication. The method includes transmitting data between network nodes with wireless millimeter-wave beams, where the nodes are configured into a dual-ring (dual-loop) network operating at one or more millimeter-wave frequencies. At least one of the nodes is configured to send and receive wireless millimeter-wave signals through an obstruction.

The foregoing summary does not define the limits of the appended claims. Other aspects, embodiments, features, and advantages will be or will become apparent to one with skill in the art upon examination of the following figures and detailed description. It is intended that all such additional features, embodiments, aspects, and advantages be included within this description and be protected by the accompanying claims.

BRIEF DESCRIPTION OF DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more examples of a wireless communication network and method, as well as exemplary components of such wireless communication networks. These examples, offered not to limit, but only to exemplify and teach embodiments of the components, systems, networks, and methods, are shown and described in sufficient detail to enable those skilled in the art to practice what is claimed. Thus, where appropriate to avoid obscuring the invention, the description may omit certain information known to those of skill in the art. The disclosures herein are examples that should not be read to unduly limit the scope of any patent claims that may eventual be granted based on this application.

The word "exemplary" is used throughout this application to mean "serving as an example, instance, or illustration." Any system, method, device, technique, feature or the like described herein as "exemplary" is not necessarily to be construed as preferred or advantageous over other features.

As used in this specification and the appended claims, the singular forms "a," "an," and "the" include plural referents unless the content clearly dictates otherwise.

Also, the use of "or" means "and/or" unless stated otherwise. Similarly, "comprise," "comprises," "comprising" "include," "includes," and "including" are interchangeable and not intended to be limiting.

The disclosed wireless communication systems can operate in the millimeter frequency spectrum and use phased array antennas (PAAs) with beamformers to provide very high data rates to and from end devices.

Figure 1:
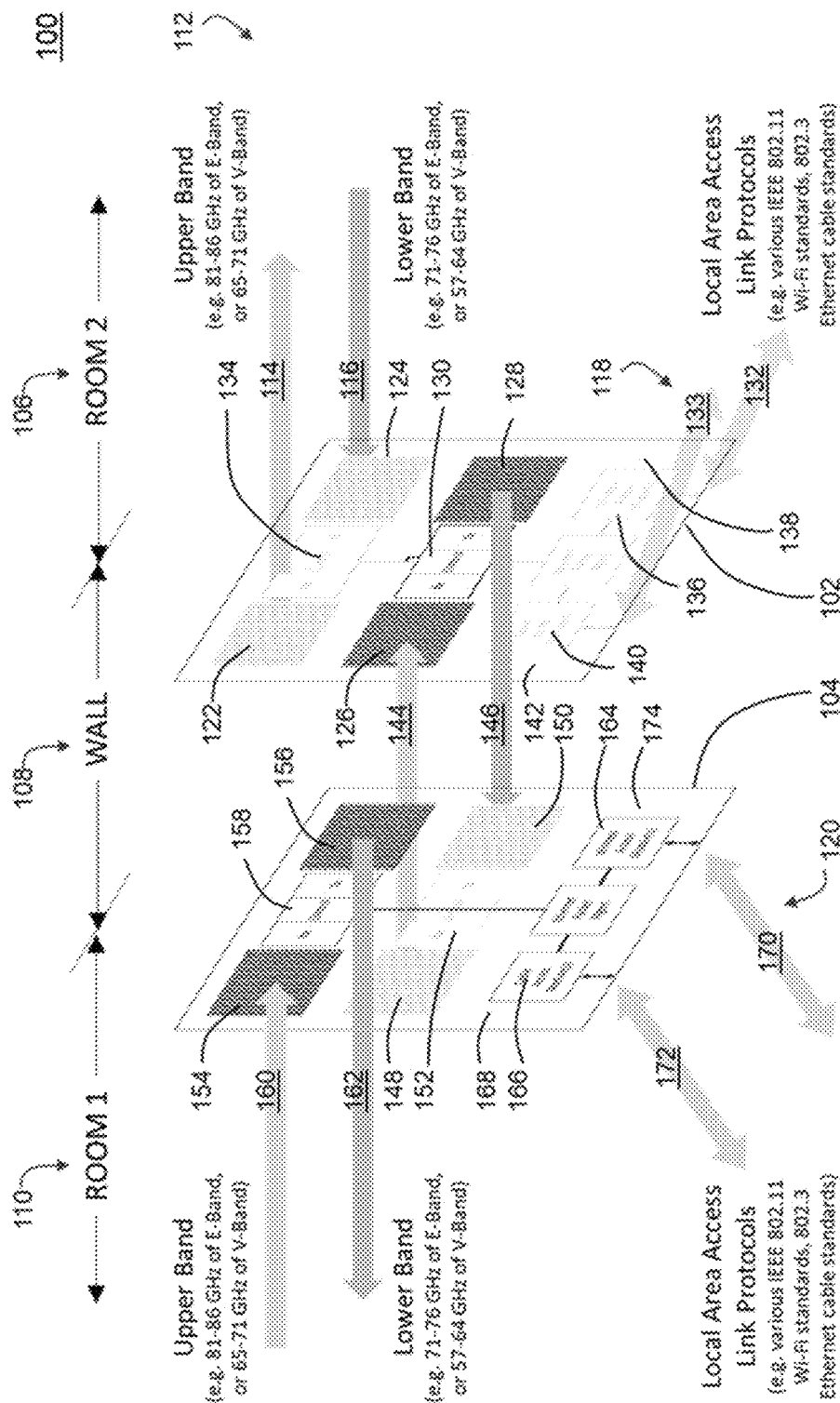
FIG. 1 is a first schematic perspective view of a first exemplary wireless communication system.

FIG. 1 is a schematic illustration of an exemplary wireless communication system 100. The system 100 includes two apparatuses (e.g., panels 102, 104), each configured to send millimeter-wave wireless signals over a wireless link through one or more obstructions, such as walls, barriers, other structures, through unobstructed air, or the like. Millimeter-wave signals can and do pass through certain obstructions, such as build walls, but the signal strength or quality may be degraded. Degradation can be caused to attenuation, reflection and/or other physical processes occurring between the obstruction and the wireless signal. Likewise, moisture content within air (humidity) also contributes to a reduction of received signal power. The wireless communication system 100 allows millimeter-wave signals to pass efficiently and reliably through one or more obstructions, with reduced degradation. Accordingly, the system 100 may improve the reliability of wireless millimeter-wave communication across increased line-of-sight range, and through obstructions, such as those found within buildings or other manmade structures.

In the example shown in FIG. 1, the first panel 102 is mounted on one side of a wall 108 (not shown), and the second panel 104 is mounted on the opposite side of the wall 108. The first and second panel 102, 104 may be generally aligned with each other. The panels 102, 104 may each include any suitable means for attaching to the wall 108, including hooks, adhesives, mounts, fasteners such as screws or nails, eyelets, wires, or the like. Furthermore, panels 102 or 104 may be mounted from overhead, such as from the ceiling, or mounted atop a floor stand (with no wall contact in either case).

The panels 102, 104 may each include or be a support for components of the panels 102, 104, respectively. For example, the panels 102, 104 may each include one or more printed circuit boards, such as a multilayer boards, ceramic multilayer boards, or the like upon which components may be mounted and connected together as appropriate, where the board may act as a support, at least in part. The components may also/alternatively be mounted within the panel substrate, such as buried in the layers of the boards. The panels 102, 104 may also each include one or more housings, frames, or casings or any combination of the aforementioned that may act as supports. Although shown as being rectangularly-shaped in the figures, the panels 102, 104 may be any suitable shape, for example, circular or square.

The first panel 102 includes a first set of antennas having a first receiving phased array antenna (PAA) 126 directed toward the wall 108, and a first transmitting PAA 128 also directed toward the wall 108. The first PAAs 126, 128 are each in communication with a first millimeter-wave transceiver 130 included in the first panel 102. The first PAAs 126, 128 are configured to receive and transmit millimeter-wave signals 144, 146, respectively, through the wall 108 from and to corresponding first PAAs 148, 150 included on the second panel 104 as a first set of antennas. Similar to the first panel 102, the first PAAs 148, 150 are each directed toward the wall 108 and in communication with a first millimeter-wave transceiver 152 included in the second panel 104. The millimeter-wave signals 144, 146 may carry data, such as communication information, between the two panels 102, 104.

Although the signals 144, 146 of the wireless link passing through the wall 108 may be any suitable frequency band, in the example shown, the first signal 144 is in the upper portion of the V-Band between 65-71 GHz, and the second signal 146 is in the lower portion of the V-Band between 57-64 GHz. The use of multiple communication bands within a given wireless link has advantages in that it may increase reliability, increase available bandwidth and improve compatibility of the system 100.

The panels 102, 104 may communicate with other networked panels by wirelessly transferring data to other similarly configured wireless systems located nearby using millimeter-wave wireless signals. In the example shown in FIG. 1, this is done by wirelessly transmitting and receiving millimeter-wave beams 114, 116, 160, 162 within room 1 110 and room 2 106, respectively. To accomplish this, the first panel 102 includes a second set of antennas having a second transmitting PAA 122 directed toward room 2 106, and a second receiving PAA 124 also directed toward room 2 106. The second PAAs 122, 124 are each in communication with a second millimeter-wave transceiver 134 included in the first panel 102. The second PAAs 122, 124 are configured to transmit and receive millimeter-wave beams 114, 116, respectively, in the room 2 106. The millimeter-wave beams 114, 116 may carry data, such as communication information, between the first panel 102 and other networked devices (not shown). A controller included in the first panel 102 may be adapted to manage data transfer and flow between the first wireless transceiver 130 and the second wireless transceiver 134. One or more data busses of the first panel 102 may couple the transceivers 130, 134 and other components.

Although the beams 114, 116 of the wireless link passing through room 2 106 may be any suitable frequency band, in the example shown, the transmitted beam 114 is in the upper portion of the V-Band between 65-71 GHz, and the received beam 116 is in the lower portion of the V-Band between 57-64 GHz.

To permit millimeter-wave communications in room 1 110, the second panel 104 includes a second set of antennas having a second transmitting PAA 156 directed toward room 2 110 and a second receiving PAA 154 also directed toward room 1 110. The second PAAs 154, 156 are each in communication with a second millimeter-wave transceiver 158 included in the second panel 104. The second PAAs 154, 156 are configured to receive and transmit millimeter-wave beams 160, 162, respectively, in the room 1 110. The millimeter-wave beams 160, 162 may carry data, such as communication information, between the second panel 104 and other networked devices (not shown). A controller included in the second panel 104 may be adapted to manage data transfer and flow between the first wireless transceiver 152 and the second wireless transceiver 158. One or more data busses of the second panel 104 may couple the transceivers 152, 158 and other components.

Although the beams 160, 162 of the wireless link passing through room 1 110 may be any suitable frequency band, in the example shown, the transmitted beam 162 is in the lower portion of the V-Band between 57-64 GHz, and the received beam 160 is in the upper portion of the V-Band between 65-71 GHz The controllers in each panel 102, 104 may be configured so that a fully-duplexed wireless communication path 112 is available through the wall 108 and rooms 106, 110 by way of the antennas 122, 124, 126, 128, 148, 150, 154, 156 and panel transceivers 130, 134, 152, 158. In certain modes of operations, the controllers in each panel 102, 104 may be configured so that the system 100 acts as a wireless repeater, capable of wirelessly passing information between rooms 1 and 2 through wall 108.

Each of the panels 102, 104 may also include local wireless and/or cable interfaces, e.g., access control units (ACUs) 142, 174, respectively, for communicating with one or more terminal networked devices in room 2 and 1, respectively. Each of the local interfaces may include an access control unit (ACU) that includes certain functions and components that serve to manage and deliver data packets, e.g., Ethernet packets, of information from the wireless communication path 112 to terminals in the local rooms 1 and 2 (rooms 110 and 106) of the panel locations. Similarly, the ACU functions and components serve to receive information from the local terminals and insert the packets of information into the information flow over the wireless communication path 112.

The components of the ACU of the first panel 102 may include an Ethernet packet manager 136 and one or more access modules, e.g., a wireless access module 140 and a cable access module 138. The components of the ACU of the second panel 104 may include an Ethernet packet manager 166 and one or more access modules, e.g., a wireless access module 164 and a cable access module 168. Software/firmware may also be used to control communications between the modules and the packet manager in each panel 102, 104 over respective data busses. The Ethernet packet managers 136, 166 may each be implemented using a commercially-available Ethernet switch, such as an Ethernet switch available from Cavium, Inc. The access modules 138, 140, 164, 168 in each panel 102, 104 may each include commercially-available chipsets and/or software/firmware that implement standards-based local communication protocols, such as one or more of the IEEE 802.11 Wi-Fi standards or IEEE 802.3 Ethernet cable standards. Each of the ACUs may also include one or more antennas and/or cable ports As shown in FIG. 1, each Ethernet packet manager 136, 166 is coupled to the transceiver 130, 134, 152, 158, in its respective panel 102 or 104 by one or more data busses.

The functions of the ACU in each panel may include a 1) Ethernet switch and associated packet management buffers, buses, and memory, 2) wireless modules (transceivers) that adhere to IEEE 802.11 protocol (various versions of 802.11 depending on the panel configuration), and 3) Ethernet ports for cable connections. In each panel 102, 104, data that is transmitted and received from the bus from the upper two transceivers 130, 134, 152, 158 is encapsulated Ethernet packet information at a baseband frequency. The Ethernet processor in each packet manager 136, 166 de-encapsulates the data, decides if its destination is within the local area its respective room (based on destination address information included in the packet). If not, the packet manager sends the packet back up to the transceivers 130, 134, 152, 158 so that the packet continues its journey on the wireless communication path 112. If the data's destination is the local area, a controller included in the respective packet manager 136, 166 determines whether it is to be sent over a wireless access module or out the Ethernet port of a cable access module. Conversely, information (data packets) that comes inbound from the local end terminal devices is encapsulated into one or more Ethernet packets by the ACU and placed up and on its way to the upper transceivers so that it may be transferred on the wireless communication path 112.

Although FIG. 1 shows ACUs including both wireless and cable access modules, any suitable configuration of access modules may be used in each panel. For example, only one wireless access module may be included in some panel configurations with no cable access module. Other panel configurations may include only one or more cable access modules with no wireless access module, while other panel configurations may include three or more access modules, either wired or wireless.

Although the local access communication paths 118, 120 may each be any suitable frequency band or protocol, in the example shown, the local wireless paths 132, 170 may each be IEEE 802.11 Wi-Fi signals (any suitable version of Wi-Fi), Bluetooth, or the like; and the local wired paths 133, 172 may each be IEEE 802.3 Ethernet signals or the like. Alternatively, the local communication paths 118, 120 may comply with any suitable FCC and International agency wireless and cable standards.

The wireless interfaces 142, 174 may be omitted from the first and second panels 102, 104 in some configurations of the system 100.

The controller included in each of the panels 102, 104 may be any suitable means for controlling the operation of the respectively panel, as well as the system 100. For example, the controller may include one or more processors for executing instructions or code, such as one or more digital signal processors (DSPs), general purpose microprocessors, application specific integrated circuits (ASICs), field programmable logic arrays (FPGAs), or other equivalent integrated or discrete logic circuitry. The controller may also include memory. The memory and processor may be combined as a single chip.

The functions of the controller may be implemented in hardware, software, firmware, or any suitable combination thereof. If implemented in software, the functions may be stored as one or more instructions or code on a computer-readable medium (e.g., memory) and executed by a hardware-based processing unit (e.g., a processor). Computer-readable media may include any computer-readable storage media, including data storage media, which may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

The data busses described herein may be high-speed digital busses constructed from commercially-available components, including commercially-available hardware, software and/or firmware. Alternatively/additionally, one or more of the data busses may include custom components for providing high-speed data transfers.

Figure 2A:
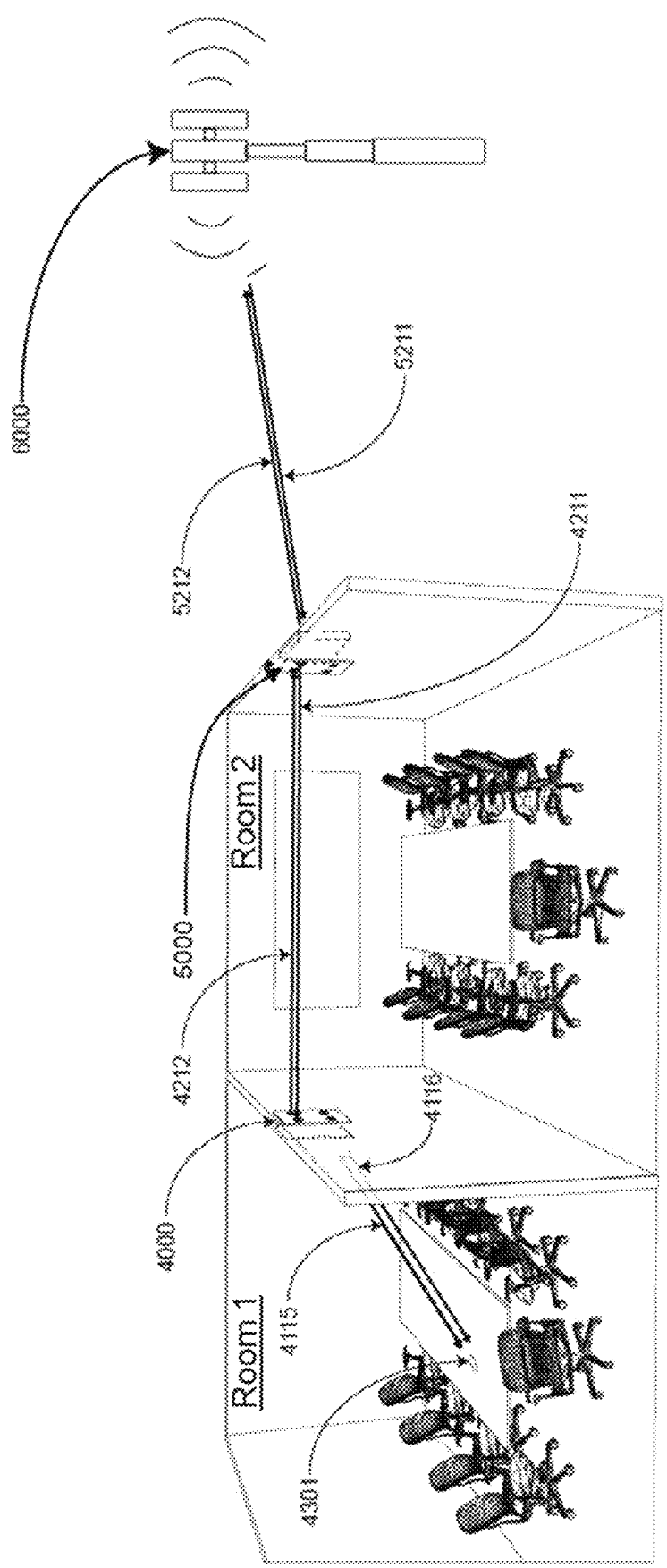
FIG. 2a is a contextual schematic illustration of a first exemplary wireless communication network in an enterprise environment, which includes a disclosed wireless communication system.

FIG. 2a is a contextual schematic illustration of an exemplary wireless communication network in an enterprise environment, which includes one or more of the disclosed wireless communication systems. The network includes two wireless systems 4000, 5000 each configured to provide wireless millimeter-wave communications through obstructions, such as walls, in an exemplary enterprise. The system 4000 is mounted on an interior wall. The system 5000 is mounted on an exterior wall. Each of the systems 4000, 5000 may include any of the two-panel wireless communication systems disclosed herein, for example, the system 100 disclosed in connection with FIG. 1 or system 4000 described in further detail below.

As shown in FIG. 2a, the system 4000 is installed on the interior wall between room 1 and room 2. Installation does not require actually cutting a hole in the wall. This is particularly advantageous in situations where walls contain asbestos or other materials that generate hazardous dust when cut, drilled or abraded. Installation can be achieved by simply attaching the two panels which comprise system 4000 to either side of the wall. The attachment of panels to the wall may be performed using any suitable means, for example, by adhesive or using nails, screws, hooks, eyelets or the like. The two panels may be aligned in order achieve optimal performance. The panel alignment may be achieved by use of built-in auto-alignment circuitry included in the panels of the system 4000 or by portable instrumentation developed to aid the alignment procedure.

The system 5000 serves as gateway for the enterprise buildings, as it allows communications from the enterprise to the Internet cloud via an external device, for example an enterprise server or a remote base station 6000. In this example, millimeter-wave beams 5211 and 5212 comprise a duplex frequency domain division (FDD) connection between the first system 5000 of the enterprise network and the Internet cloud via a remote base station 6000. Although the beams 5211, 5212 of the wireless link between system 5000 and base station 6000 may be any suitable frequency band, in the example shown, the transmitted beam (uplink) 5212 may be in the E-Band between 81-86 GHz, and the received beam (downlink) 5211 may be in the E-Band between 71-76 GHz.

A second wireless link between system 5000 and system 4000 allows communications between the two systems 4000, 5000. In this example, millimeter-wave beams 4211, 4212 of the second link provide a duplex FDD connection between the first system 5000 and the second system 4000. Although the beams 4211, 4212 of the second wireless link may be any suitable frequency band, in the example shown, the transmitted beam 4212 from the second system 4000 to the first system 5000 may be in the E-Band between 81-86 GHz, and the received beam 4211 from the first system 5000 to the second system 4000 may be in the E-Band between 71-76 GHz.

The first panel (in Room 1) of the second system 4000 provides additional links 4115 to one or more terminal devices 4301 in the second room. The terminal devices 4301 may be any wirelessly enabled device, for example, a computer such as a laptop, smartphone, cable box, gaming console, or non-wireless terminals equipped with standard Ethernet interface ports.

Figure 2B:
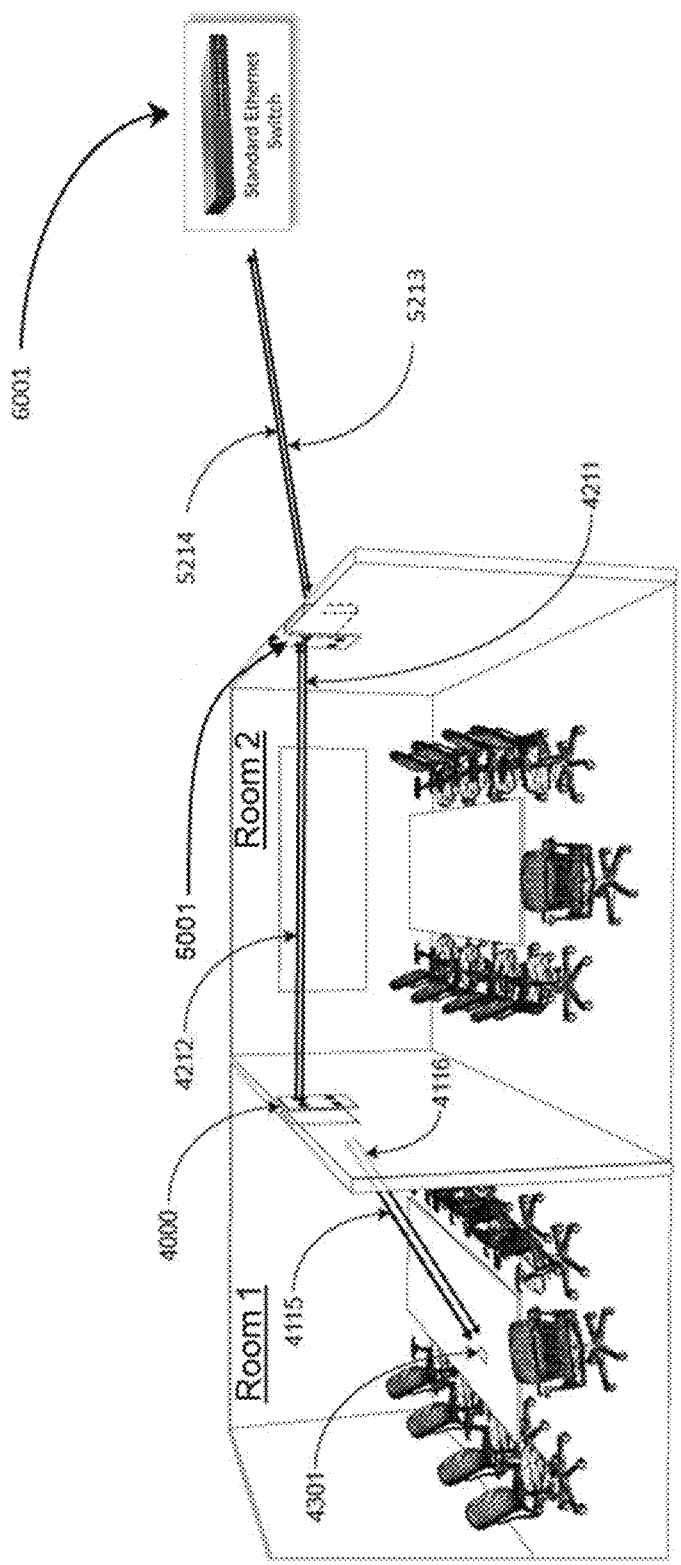
FIG. 2b is a contextual schematic illustration of a second exemplary wireless communication network in an enterprise environment, which includes a disclosed wireless communication system.

FIG. 2b is a contextual schematic illustration of an exemplary wireless communication network in an enterprise environment, which includes one or more of the disclosed wireless communication systems. The network includes two wireless systems 4000, 5001 each configured to provide wireless millimeter-wave communications through obstructions, such as walls, in an exemplary enterprise. Similar to FIG. 2a, the system 4000 is mounted on an interior wall. However, in the example of FIG. 2b, the system 5001 is also mounted on an interior wall and connects to a gateway in the configuration of a standard Ethernet switch 6001. In this manner, switch 6001 serves as the gateway for the enterprise infrastructure, as it allows communications from the enterprise to the Internet cloud via the switch 6001.

Each of the systems 4000, 5001 may include any of the two-panel wireless communication systems disclosed herein, for example, the system 100 disclosed in connection with FIG. 1 or systems 4000, 7000 described in further detail below.

Figure 3:
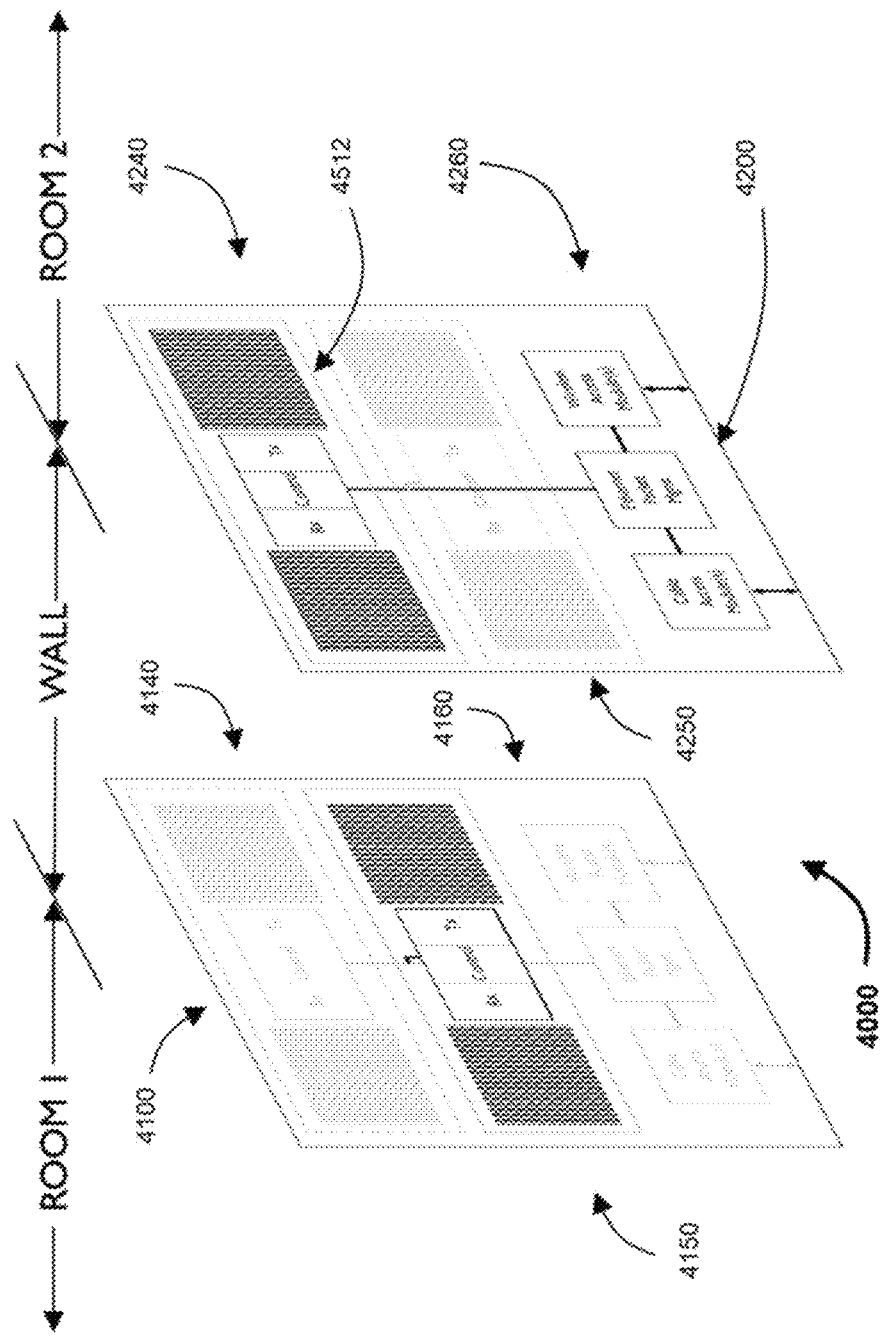
FIG. 3 is a second schematic perspective view of the first exemplary wireless communication system of FIG. 1, includable in the wireless networks disclosed herein.

FIG. 3 is a second schematic perspective view of an exemplary wireless communication system 4000 includable in the wireless networks disclosed herein, e.g., the network shown in FIGS. 2a-b. The system 4000 may include the same components and functions of the system 100 shown in FIG. 1. The system 4000 may be replicated and used as both systems 4000, 5001 of the network depicted in FIG. 2b.

The system 4000 includes two separate panels 4100, 4200, which are each mounted to opposite sides of a wall separating room 1 and room 2, respectively. The panels 4100, 4200 are substantially aligned with each other so that millimeter-wave signals can be successfully transfer data between the panels 4100, 4200 through the wall. The system 4000 may be installed on two sides of a wall that separates room 1 and room 2. The height of the installation may be seven feet above the floor, but installation height is not constrained to any height.

Installation, alignment, and configuration of the system 4000 may be controlled by a separate wand or handheld device that is in wireless communication with the panels 4100, 4200. The wand may include a user interface, a display, and a Bluetooth interface that can pair with each panel 4100, 4200. For example, the wand may be a smartphone with an operating system and application software for interfacing with the panels 4100, 4200.

Installation and alignment of the panels 4100, 4200 on a wall can be accomplished using the following method: 1) panel 4100 is attached to the wall, and connected to power (wall outlet) and turned on; 2) using the Bluetooth link, the panel 4100 and wand are paired; 3) the second panel 4200 is temporarily attached to the other side of the wall, and connected to power (wall outlet) and turned on; 4) the second panel 4200 is moved on the wall until a green "Alignment OK" indicator is displayed by the wand; 5) the second panel 4200 is then permanently attached to the wall; 6) a "join network" button is pushed on the wand, causing the first and second panel 4100, 4200 to establish communications between each other and other network elements over the wireless links; and 7) the wand displays an "Installation OK" message once the panels 4100, 4200 communicate to the wand over the Bluetooth link that they have successfully connect to the network.

Once installed, the panels 4100 and 4200 make up the system 4000.

The system 4000 may transmit and receive information at V-Band or E-Band frequencies to/from room 1 and room 2. The system 4000 may also transmit and receive Ethernet packet traffic within room 1 and room 2 via wireless or cable access control units (ACUs) 4260, 4160.

In this example, each of the panels 4100, 4200 contains two circuits of phased array antennas with embedded transceiver and control electronics (PAAXs) and one ACU. With the advent of deep submicron CMOS technology, phased array antennas with embedded transceiver and control electronics (PAAX) have become a practical implementation.

The first panel 4100 includes a first PAAX 4140 (which may include components 154, 156, 158 of FIG. 1), a second PAAX 4150 (which may include components 148, 150, 152 of FIG. 1), and an ACU 4160 (which may include components of ACU 174 of FIG. 1). The first PAAX 4140 has two phased array antennas on one side of the panel 4100 directed toward room 1. The second PAAX 4150 has two phased array antennas on the other side of the panel 4100 facing the wall. The ACU 4160 has Ethernet packet management, wireless and cable interface modules for linking to terminals within the rooms, as described in connection with FIG. 1.

Likewise, the second panel 4200 includes a first PAAX 4240 (which may include components 122, 124, 134 of FIG. 1), a second PAAX 4250 (which may include components 126, 128, 130 of FIG. 1), and an ACU 4260 (which may include components of ACU 142 of FIG. 1). The first PAAX 4240 has two phased array antennas on one side of the panel 4200 directed toward room 2. The second PAAX 4250 has two phased array antennas on the other side of the panel 4200 facing the wall. The ACU 4260 has Ethernet packet management, wireless and cable interface modules for linking to terminals within the rooms.

The system 4000 may be configured so that the first panel 4100 provides full duplex FDD on the V-Band or E-Band frequencies using the first PAAX 4140 in room 1; and full duplex FDD on the V-Band or E-Band frequencies using the second PAAX 4150 through the wall. And the second panel 4200 provides full duplex FDD on the V-Band or E-Band frequencies using its first PAAX 4240 in room 2; and full duplex FDD on the V-Band or E-Band frequencies using the second PAAX 4250 through the wall.

Each PAAX has control circuitry for electrically setting beamformer parameters. Beamformer parameters may control either the width of the beam, or the direction in which the beamformer points, or both. The control may be asserted by the following means: 1) embedding switches within the PAA and using such switches to reconfigure conductive elements which comprise the PAA; 2) phase-shifting the signals sent to or received from elements of the PAA; and/or 3) digitally generating incremental delay among the signals sent to individual antenna elements.

Crosstalk among the beams is reduced by in the following ways. First, the physical design of the panels minimizes the level of Tx fields that are seen by Rx PAAs. Second, reflectors of millimeter-wave radiation may be embedded within the panels 4100, 4200. Thickness of the reflectors is optimized and simulated in order to ensure that the efficiency benefit gained thereby is not cancelled by the signal degradation caused by multipath propagation introduced by said reflectors. And third, attenuators may be embedded within the panels. The attenuators may be implemented as metamaterials or by conventional lossy materials.

Each PAAX may include beamforming-control circuits, transmitter-drive circuits, RF lens and enclosure elements.

Design of the V-Band and E-Band antennas used within the PAAXs is now discussed. In some configurations, there is no need for a Tx/Rx switch because Tx and Rx antenna elements are implemented as subarrays within each PAAX. Elimination of Tx/Rx switch results in elimination of losses and parasitics associated with the switch. Consequently, link margin is improved.

Each PAAX may be an adaptive array system, which uses adaptive nulling, beam forming, and beam steering. Because antenna elements as well as transceiver elements are embedded within each PAAX, there may be no need for a power combiner or transmission line in the Tx antenna array. Economic costs and performance degradation associated with the power combiner and said transmission line can thus be avoided. Each antenna may be a dedicated integral phased array antenna as defined by European Telecommunications Standards Institute (ETSI). It features dynamic auto-alignment and installation alignment. The antenna is not required to be a stand-alone antenna or a selectable beam antenna. However, some configurations of the system 400 can be built using selectable beam antennas or stand-alone antennas.

In other embodiments, each panel 4100, 4200 may have a greater or fewer number of PAAXs and each panel 4100, 4200 may have a different number of PAAXs than the other panel.

Figure 4:
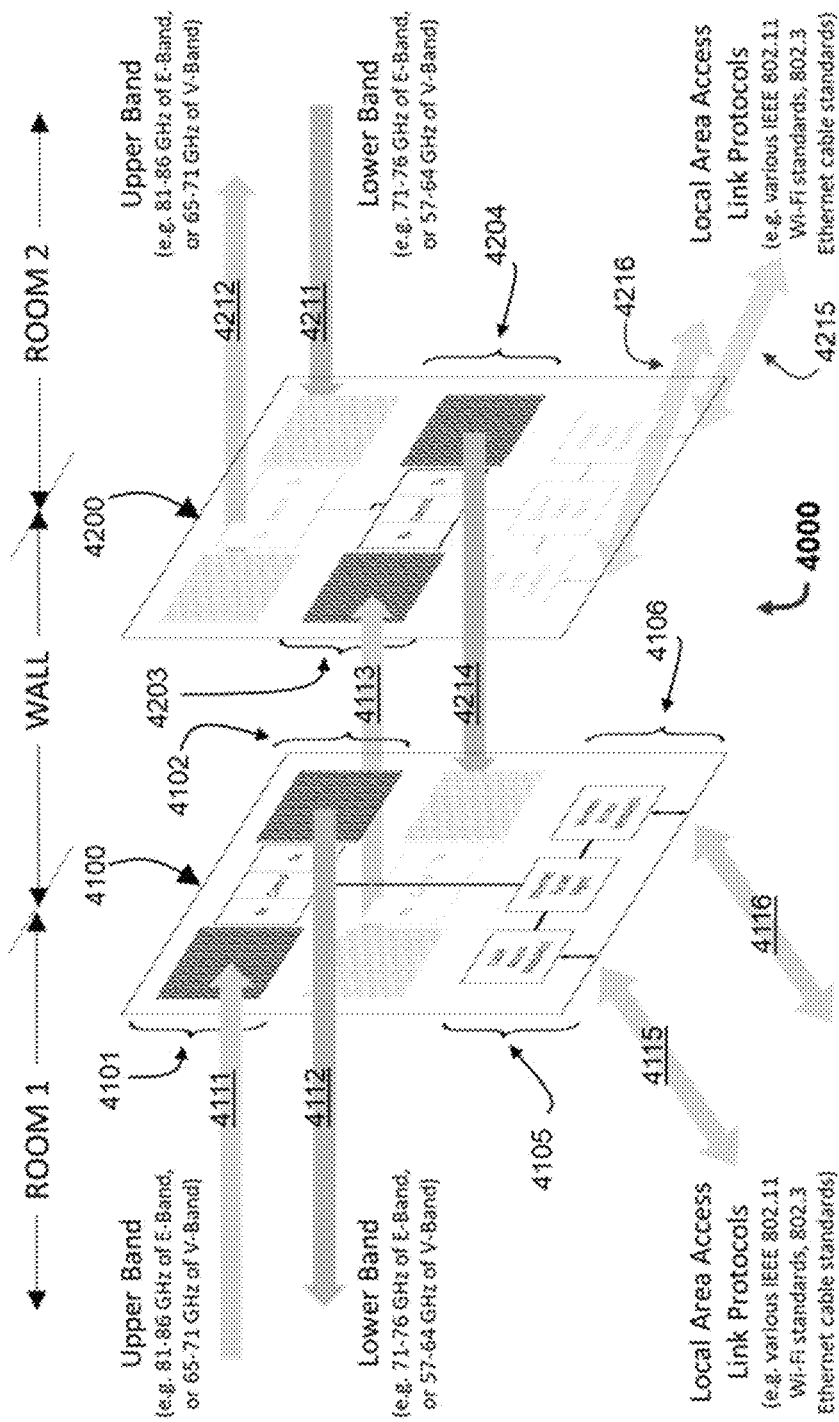
FIG. 4 is a third schematic perspective view of the first exemplary wireless communication system of FIG. 1.
Figure 5:
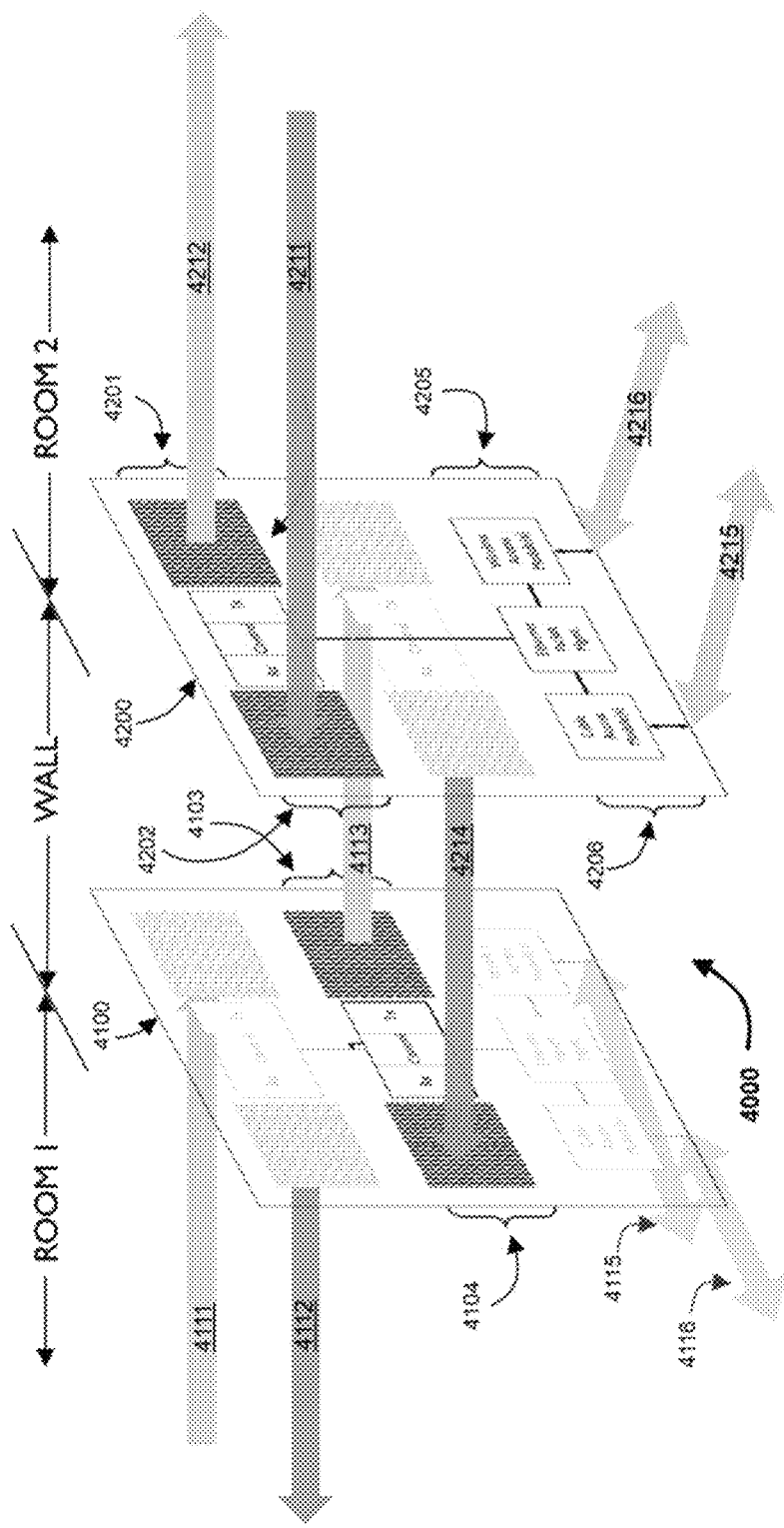
FIG. 5 is a fourth schematic perspective view of the first exemplary wireless communication system of FIG. 1.

FIGS. 4 and 5 are additional schematic perspective views, respectively, of the exemplary wireless communication system 4000. These views show further details of the wireless beam data flows and structure of the system 4000. Table 1 summarizes the panels and their transmit (Tx) and receive (Rx) components by the element numbers shown in FIGS. 4 and 5, along with the element numbers of the corresponding millimeter wave beams.

TABLE 1

Rx and Tx components of panel.

| Panel | Ref number | Frequency <GHz> | Function | Direction | Beam number | PAAX number |
|---|---|---|---|---|---|---|
| 4100 | 4101 | 65-71 | RX | Room 1 | 4111 | 4140 |
| 4100 | 4102 | 57-64 | TX | Room 1 | 4112 | 4140 |
| 4100 | 4103 | 65-71 | TX | Wall | 4113 | 4150 |
| 4100 | 4104 | 57-64 | RX | Wall | 4214 | 4150 |
| 4100 | 4105 | Local wired | TX/RX | Room 1 | 4115 | 4160 |
| 4100 | 4106 | Local wireless | TX/RX | Room 1 | 4116 | 4160 |
| 4200 | 4201 | 57-64 | RX | Room2 | 4211 | 4240 |
| 4200 | 4202 | 65-71 | TX | Room2 | 4212 | 4240 |
| 4200 | 4203 | 65-71 | RX | Wall | 4113 | 4250 |
| 4200 | 4204 | 57-64 | TX | Wall | 4214 | 4250 |
| 4200 | 4205 | Local wireless | TX/RX | Room2 | 4215 | 4260 |
| 4200 | 4206 | Local wired | TX/RX | Room2 | 4216 | 4260 |

In the example system 4000 shown in FIGS. 3, 4 and 5, there are three wireless links, each having a pair of beams. As shown in FIG. 4, in the first link wireless beams 4111 and 4112 carry traffic, including data and control information, that is flowing between the system 4000 and other wireless communication system(s) located within room 1. In this example, the traffic is transmitted and received at V-Band frequencies, for example, those shown in Table 1. Also at V-Band frequencies, beams 4113 and 4214 of the second link carry information which flows through the wall between the panels 4100 and 4200 located in room 1 and room 2. Beams 4212 and 4211 of the third link carry traffic which is flowing between the system 4000 and other system(s) in room 2. The traffic carried by the first, second and third wireless links may be transmitted and received at V-Band frequencies, as shown in Table 1. In this example, signals 4115 and 4116 of the fourth link carry traffic at local wired or wireless band frequencies flowing between PAAX 4160 of the first panel 4100 and terminal access points within room 1. Also in this example, signals 4215 and 4216 of the fifth link carry traffic at local wired or wireless band frequencies flowing between PAAX 4260 and terminal access points within room 2. As described above in connection with FIG. 1, the local access communication paths 4115, 4116, 4215, 4216 may each be any suitable frequency band or protocol, for example, the local wireless 4116, 4215 may each be IEEE 802.11 Wi-Fi signals (any suitable version of Wi-Fi), Bluetooth, or the like; and the local wired paths 4115, 4216 may each be IEEE 802.3 Ethernet signals or the like. Alternatively, the local communication paths may comply with any suitable FCC and International agency wireless and cable standards.

Each of the panels 4100, 4200 includes a plurality of millimeter-wave receivers (Rx's) and a plurality of millimeter-wave transmitters (Tx's). The phased-array antennas of each panel 4100, 4200 may be permanently electrically connected to either Rx or Tx RF front end circuitry, respectively. Correspondence between RF circuits 4101-4106 and 4201-4206 and area of the panels is shown in FIGS. 3, 4 and 5 and given in Table 1.

Each of the Rx circuits 4101, 4104, 4106, 4203, 4202, 4205 generates a respective digital bit stream that corresponds to the waveform of the millimeter-wave signal (beams) incident on the corresponding antenna array. Error correction may be performed on each of the bit streams within the transceiver associated with the PAAX that contains the Rx circuit.

The data flow through the wall uses the second wireless links represented as beams 4113 and 4214. In order to reduce attenuation and other forms of signal degradation, the beams 4113, 4214 are generally normal to the surface of the wall. PAA elements of each PAAX 4150, 4250 of the panels 4100, 4200 are aligned to ensure that each Rx PAA captures the greatest possible proportion of the energy emitted by corresponding Tx PAA of the opposing panel. The proportion of energy received may depend on the exact shape of beams generated by the Rx and Tx PAAs on the panels 4100, 4200. Link margin can be adjusted by modifying the antenna gain, power and noise figure of the Rx PAA and corresponding Tx PAA. For example, antenna gain can be increased by using a larger number of elements within either or both corresponding PAAs of a given beam path. Data passing through the wall may transmitted wirelessly using V-Band, or in other configurations, E-Band.

The system 4000 contains digital circuitry for management of dataflow between bitstreams of the various Rx circuits and digital inputs of the Tx circuits. The digital circuitry also provides leaf-level management of beamforming activity and system power. The digital circuitry may include one or more controllers in each panel 4100, 4200, such as the control described in connection with FIG. 1.

The disclosed wireless systems, including the systems 100, 4000, provide certain advantages. For example, an advantage provided by the system 4000 is the elimination of wires and cables that legacy networks use to carry communication signals because the system 4000 allows millimeter wireless communication links to pass through walls. Using the system 4000 allows millimeter-wave wireless links to replace the wires and cables. This greatly reduced installation costs to deploy the latest, high-speed digital communication technology in commercial environments. Beamformers may establish connections between nodes in a network, instead of wires or cables. Phase-array antennas with embedded transceiver electronics, such as the PAAX disclosed herein, improve the security, economy and performance of the beamformers.

A second advantage delivered by the disclosed systems is to greatly improve the data rates available in legacy wireless networks. A third advantage delivered by the disclosed systems is a reduction in eavesdropping and security, since the wireless signals can be narrow beams. A fourth advantage delivered by the disclosed systems is fast and scalable communication path tracking that may improve network speed. A fifth advantage delivered by the disclosed systems is to greatly improve penetration through walls, and when combined with other similar systems into a network, to penetrate through multiple walls and barriers commonly encountered within business enterprise environments such as buildings. The walls and obstructions might otherwise collectively increase the path loss of a signal to a point of signal failure. The disclosed systems also facilitate implementation of software-defined networks and self-organizing networks.

Figure 6:
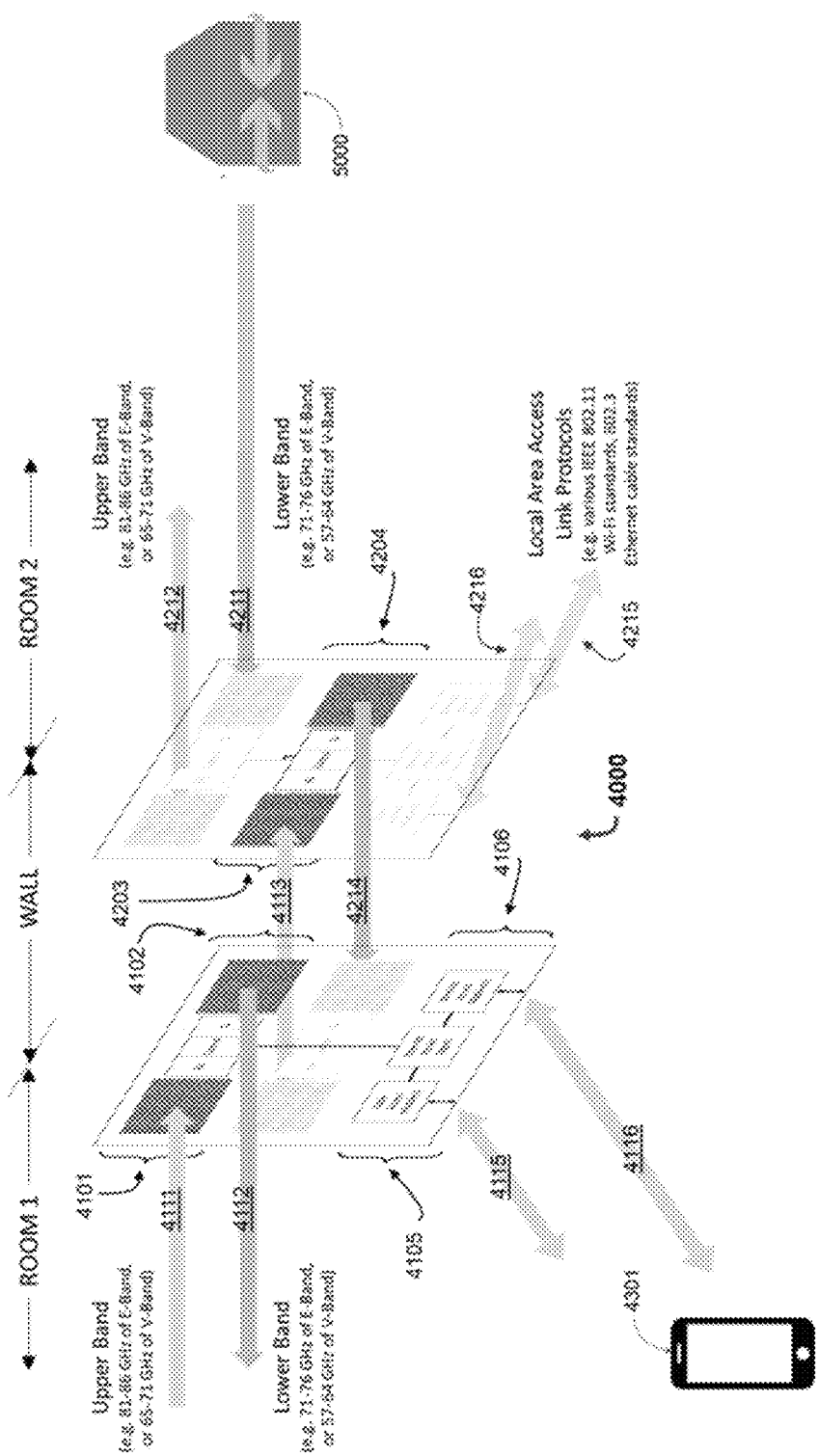
FIG. 6 is a schematic illustration of wireless communications involving the first exemplary wireless communication system.

FIG. 6 is a schematic illustration of wireless communications involving the wireless system 4000. More particularly, FIG. 6 shows communication between the end terminal 4301, which may be a WiFi-enabled mobile phone, in room 1 and wireless communication system 5000, which may include a standard Ethernet switch, in room 2.

The panels 4100 and 4200 may be physically equivalent, having essentially the same components and structures. The terminal device 4301 can send and receive wireless signals 4116 to PAA 4106. Thus, full-duplex communication is achieved between device 4301 and panel 4100 of system 4000.

The terminal device 4301 in room 1 can use system 4000 as a relay in order to communicate with the gateway system 5000 in room 2. In order to wirelessly connect device 4301 to gateway system 5000, the follow process may occur (referring back to FIG. 3): 1) establish a wireless connection between transceivers in device 4301 and the transceivers in PAAX 4160; 2) send the data over one or more internal busses in the panel 4100 from the PAAX 4160 to PAAX 4150 (this is a wired connection); 3) wirelessly send the data through the wall, using PAAX 4150 and PAAX 4250; 4) send the data over one or more internal busses in the panel 4200 from PAAX 4250 to PAAX 4240 (another wired connection); and 5) send the data wirelessly from the PAAX 4240 to a PAAX included in, or near, gateway system 5000. By the above method, data is wirelessly transmitted between terminal device 4301 and gateway system 5000 and a connection session can be established between the device 4301 and system 5000.

Figure 7:
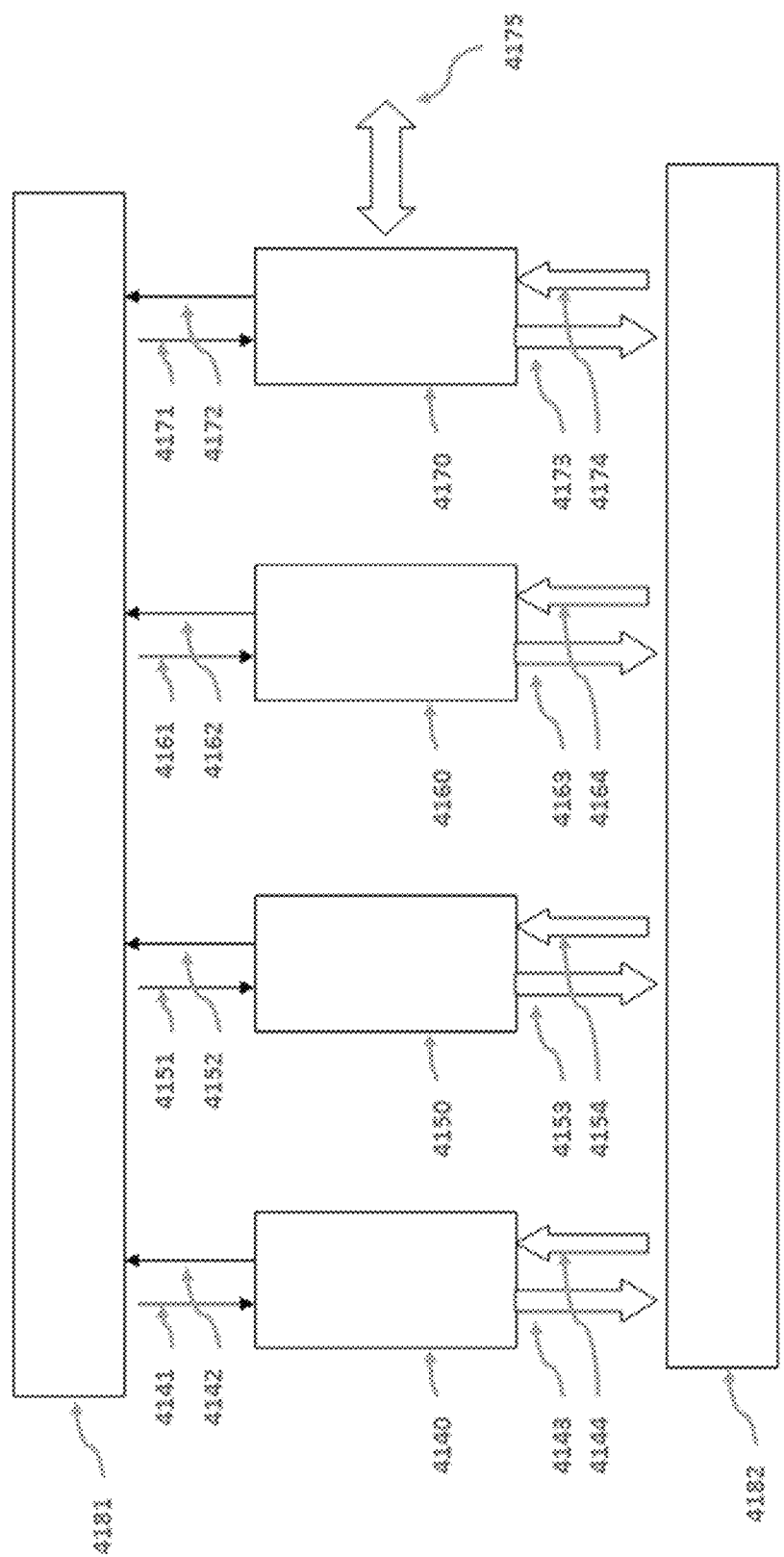
FIG. 7 is a schematic illustration of certain components of a panel included in a disclosed wireless communication system.

FIG. 7 is schematic illustration of certain components of the panel 4100 included in the wireless communication system 4000. Both panels 4100 and 4200 may include the components shown in FIG. 7. Boxes 4140, 4150 and 4160 include the PAAXs each having functionality that has been described above in connection with FIGS. 2-6. Box 4170 is a diagnostic circuit which provides access through connector 4175. A controller 4181 controls overall operation of the panel 4100. The controller 4181 may include the controller described in connection with FIG. 1. A high speed digital bus 4182 is couple to the controller 4181 and allows the controller 4181 to manage flow of digital data among PAAX blocks 4140, 4150, 4160 and the diagnostic circuit 4170.

Ports 4141, 4151, 4161, 4171 allow the controller 4181 to send control information to each of the PAAX blocks 4140, 4150, 4160 and diagnostic circuit 4170, respectively, to control configuration and operation of the PAAXs and diagnostic circuit. Ports 4142, 4152, 4162, 4172 allow each PAAX and the diagnostic circuit, respectively, to send status information and interrupt requests to controller 4181.

Ports 4143, 4153, 4163, 4173 allow each of the PAAX blocks 4140, 4150, 4160 and diagnostic circuit 4170, respectively, to send data over the high speed bus 4182. Ports 4144, 4154, 4164, 4174 allow each of the PAAX blocks 4140, 4150, 4160 and diagnostic circuit 4170, respectively, to receive data from the high speed bus 4182.

Figure 8:
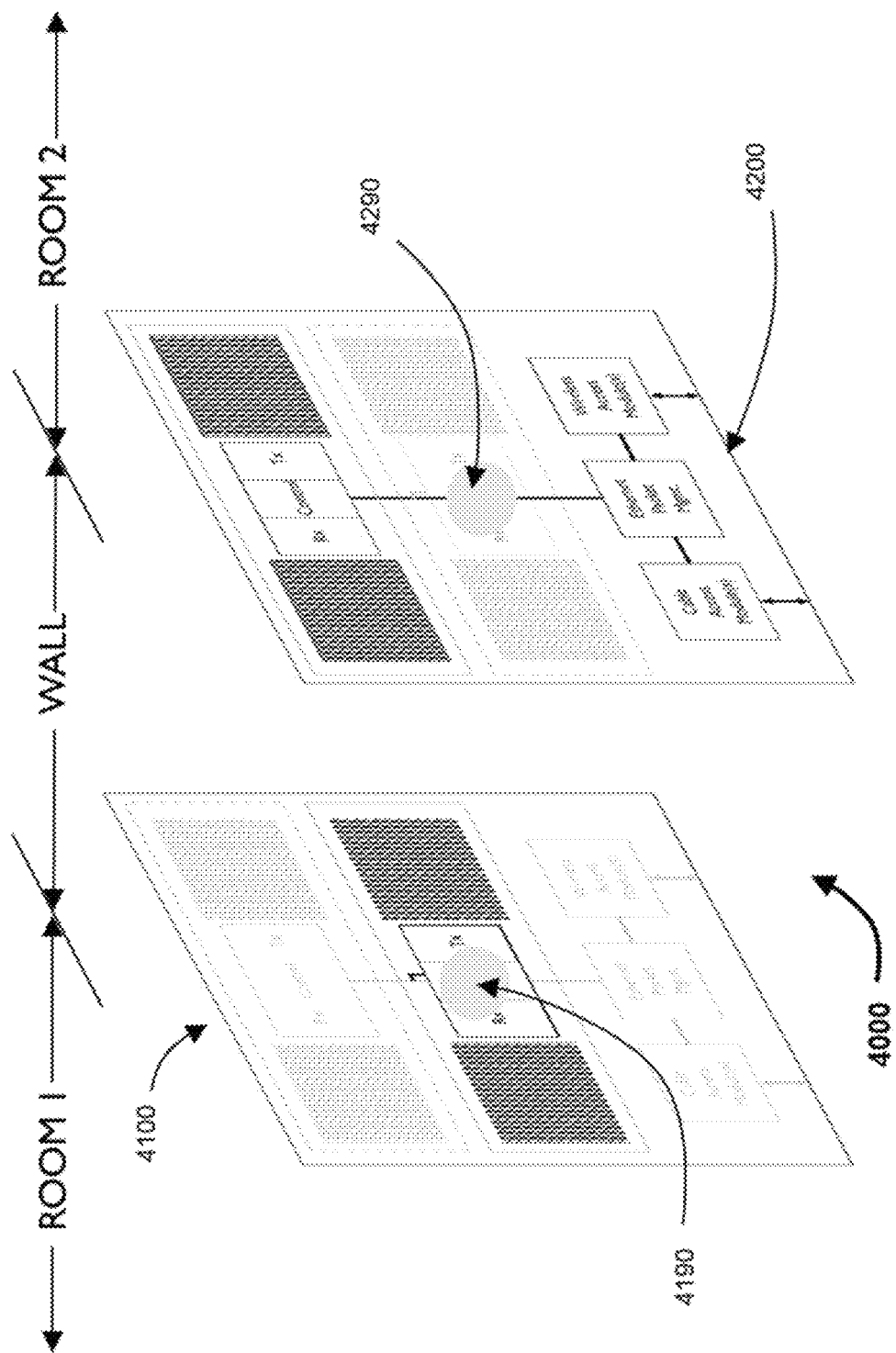
FIG. 8 is a schematic perspective view of a second exemplary wireless communication system including an optional sensor module.

FIG. 8 is a schematic perspective view of the wireless communication system 4000 wherein each of the panels 4100 and 4200 including an optional sensor module 4190, 4290, respectively. The optional module 4190 may be embedded within panel 4100; and the optional module 4290 may be embedded within panel 4200. The sensor modules 4190, 4290 may have the same functionality, structure or components. For example, the sensor module 4190 may include a processor, such as one or more microprocessors, and sensors and/or actuators that perform functions such as the following: 1) monitor location of the panel; 2) monitor distance to other wireless systems and/or terminal devices; 3) monitor environmental parameters, such as temperature, humidity and the like; 4) sense activity relevant to safety and security such as the presence of smoke or dangerous gases or intruders moving around in a room. The module 4190 may include an auxiliary wireless interfaces, such as Wi-Fi components, for example an IEEE 802.11ac transceiver and/or an IEEE 802.11az localization element. The module 4190 may also include a Bluetooth transceiver. The module 4190 may connect to panel 4100 and communication with the controller 4181 via port 4175.

Figure 9:
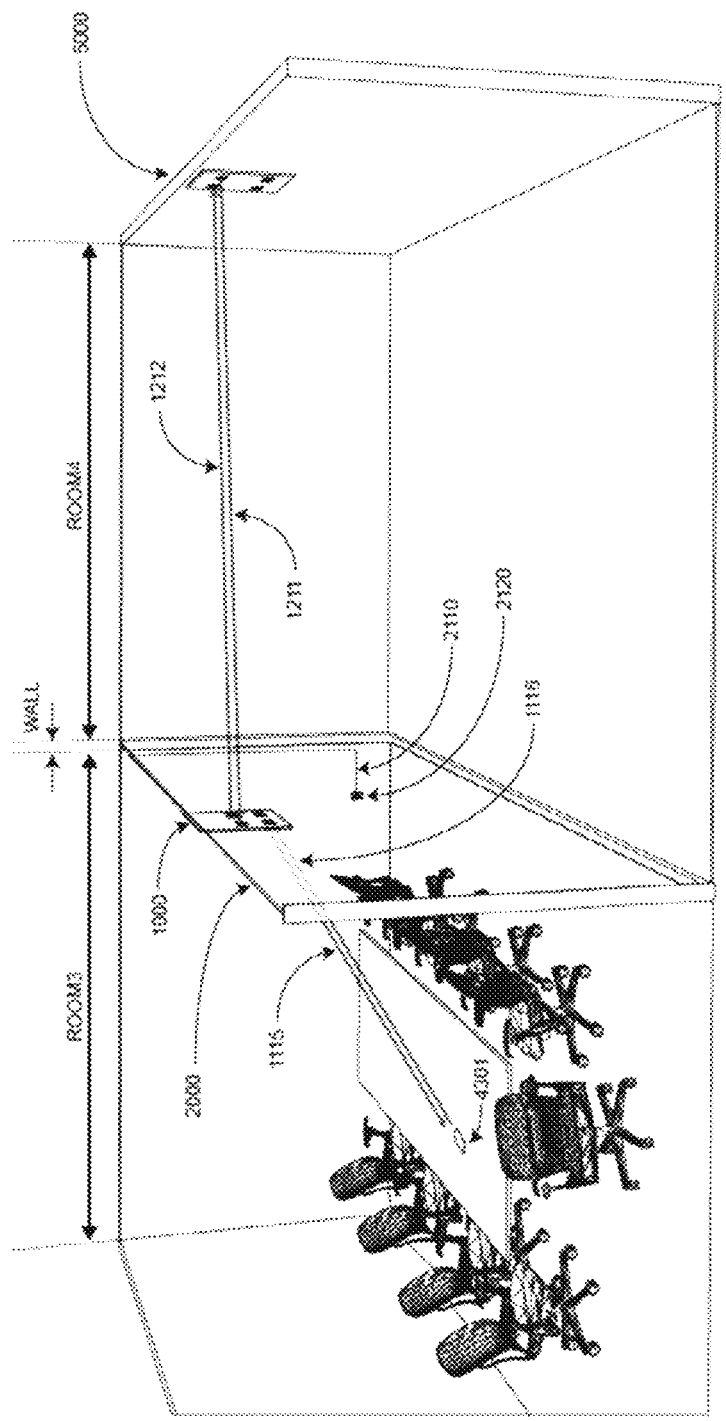
FIG. 9 is a contextual schematic illustration of a third exemplary wireless communication network in an enterprise environment, which includes a disclosed wireless communication system.

FIG. 9 is a contextual schematic illustration of a third exemplary wireless communication network in an enterprise environment, which includes a first wireless communication system 1000 communicating with a second wireless system 5000. The systems 1000, 5000 provide high-speed connectivity within an exemplary enterprise. The system 1000 is similar in function to the system 4000 described above, but differs as follows: 1) the system 1000 has only a single panel, mounted on the room 3 side of wall 2000; 2) the system 1000 communicates with system 5000 by wirelessly passing an V-Band beam through the wall 2000 into room 4; 3) the system 1000 connects to auxiliary power and communication using an Ethernet cable 2110 and power-over-Ethernet (POE) connector 2120. The wall 2000 can be glass, or it can be any other building material.

In this scenario it is possible to place the system 1000 on either side wall 2000. Asymmetry of link margins may generally determine which side is the best choice. In the case of weak link margin to terminal device 4301 and strong V-Band link margin to the system 5000, it may be better to place the system 1000 on the room 3 side of the wall 2000. Once the link placement has been determined, configuration and calibration circuitry and algorithms within the system 1000 can reduce the link power to the lowest satisfactory level. Consequently, system power may be reduced.

Solving Maxwell's equations under the specific conditions that apply within a given interior environment leads to useful estimates of the link margin for a given communication system. The relevant properties of the wall building materials may be used to calculate the link margins of wireless communication paths between systems and devices in the network. The relevant building material properties for such calculations may include: thickness, complex permittivity, attenuation, loss-tangent, and scattering coefficient.

In order to achieve adequate link margin, it is often desirable to use large arrays with narrow beams. However, in some circumstance, narrow beams may exacerbate the problem of beam misalignment.

Figure 10:
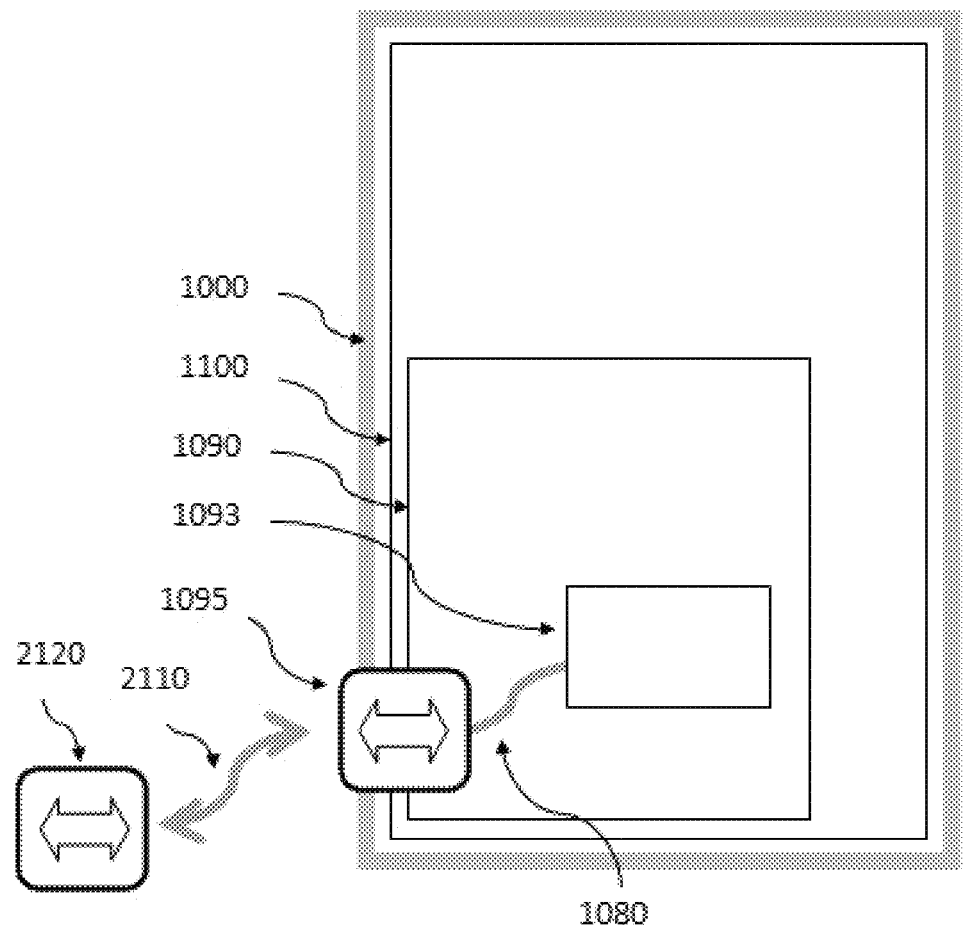
FIG. 10 is a schematic illustration of certain exemplary power supply components of a panel of a wireless system.

FIG. 10 is a schematic illustration of certain components of the panel 1100 including the optional wired communication module 1090. FIG. 10 shows how a POE (power over Ethernet) circuit 1093 may be used in order to efficiently provide both power and data to the system 1100. In this configuration, the POE circuit 1093 is included within module 1090, along with a standard RJ45 connector 1095. The cable 2110 plugs into the RJ45 connector 1095 and into a POE connector 2120 in the wall 2000 of room 3.

Figure 11:
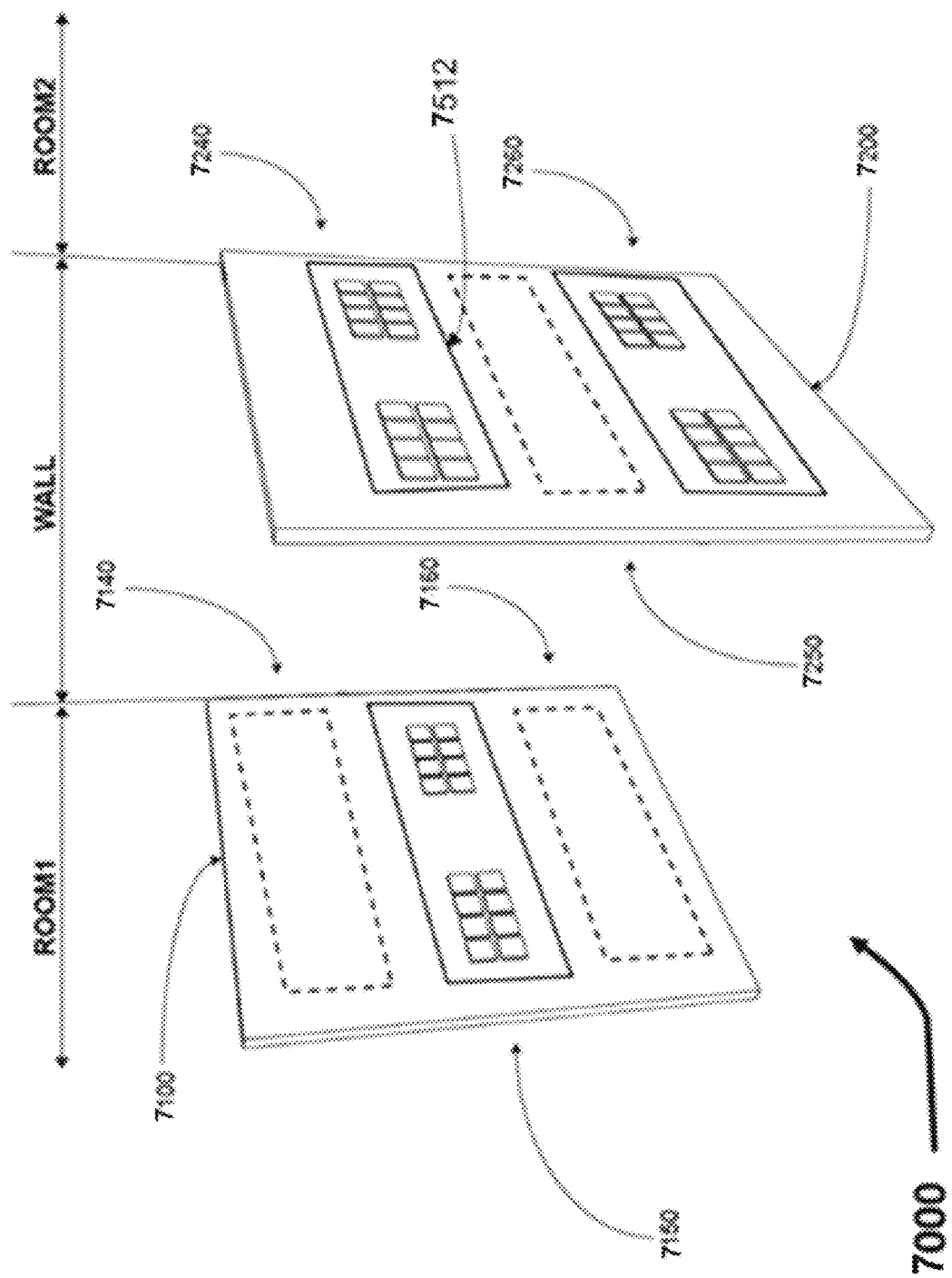
FIG. 11 is a first schematic perspective view of another exemplary wireless communication system includable in the wireless networks disclosed herein.

FIG. 11 is a first schematic perspective view of a second exemplary wireless communication system 7000 includable in the wireless networks disclosed herein, e.g., the network shown in FIGS. 2a-b and 9. The system 7000 may be replicated and used as any of systems 1000, 4000, 5000, 5001 of the network depicted in FIGS. 2a-b and 9. The predominant difference between the system 7000 and the other disclosed wireless systems 100, 4000 is that the system 7000 includes E-Band or V-Band local communication interfaces to terminal devices.

The system 7000 includes two separate panels 7100, 7200, which are each mounted to opposite sides of a wall separating room 1 and room 2, respectively. The panels 7100, 7200 are substantially aligned with each other so that relatively narrow millimeter-wave beams can be successfully transfer data between the panels 7100, 7200 through the wall. The system 7000 may be installed on two sides of a wall that separates room 1 and room 2. The height of the installation may be seven feet above the floor, but installation height is not constrained to any height.

Installation, alignment, and configuration of the system 7000 may be controlled by a separate wand that is in wireless communication with the panels 7100, 7200. The wand may include a user interface, a display, and a Bluetooth interface that can pair with each panel 7100, 7200. For example, the wand may be a 'rooting' a Nexus 6 smartphone with an operating system and application software for interfacing with the panels 7100, 7200.

Installation and alignment of the panels 7100, 7200 on a wall can be accomplished using the following method: 1) panel 7100 is attached to the wall, and connected to power (wall outlet) and turned on; 2) using the Bluetooth link, the panel 7100 and wand are paired; 3) the second panel 7200 is temporarily attached to the other side of the wall, and connected to power (wall outlet) and turned on; 4) the second panel 7200 is moved on the wall until a green "Alignment OK" indicator is displayed by the wand; 5) the second panel 7200 is then permanently attached to the wall; 6) a "join network" button is pushed on the wand, causing the first and second panel 7100, 7200 to establish communications between each other and other network elements over the wireless links; and 7) the wand displays an "Installation OK" message once the panels 7100, 7200 communicate to the wand over the Bluetooth link that they have successfully connect to the network.

Once installed, the panels 7100 and 7200 make up the system 7000.

The system 7000 may transmit and receive information at E-Band frequencies to/from room 1 and room 2. The system 7000 may also transmit and receive V-Band traffic within room 1 and room 2.

In this example, each of the panels 7100, 7200 contains three circuits of phased array antennas with embedded transceiver and control electronics (PAAXs). With the advent of deep submicron CMOS technology, phased array antennas with embedded transceiver and control electronics (PAAX) have become a practical implementation.

The first panel 7100 includes a first PAAX 7140, a second PAAX 7150, and a third PAAX 7160. The first and third PAAXs 7140, 7160 each have two phased array antennas on one side of the panel 7100 directed toward room 1. The second PAAX 7150 has two phased array antennas on the other side of the panel 7100 facing the wall. Likewise, the second panel 7200 includes a first PAAX 7240, a second PAAX 7250, and a third PAAX 7260. The first and third PAAXs 7240, 7260 each have two phased array antennas on one side of the panel 7200 directed toward room 2. The second PAAX 7250 has two phased array antennas on the other side of the panel 7200 facing the wall.

The system 7000 may be configured so that the first panel 7100 provides full duplex FDD on the E-Band frequencies using the first PAAX 7140 in room 1; full duplex FDD on the V-Band frequencies using the third PAAX 7160 in room 1; and full duplex FDD on the V-Band frequencies using the second PAAX 7150 through the wall. And the second panel 7200 provides full duplex FDD on the E-Band frequencies using its first PAAX 7240 in room 2; full duplex FDD on the V-Band frequencies using the third PAAX 7260 in room 2; and full duplex FDD on the V-Band frequencies using the second PAAX 7250 through the wall.

Each PAAX has control circuitry for electrically setting beamformer parameters. Beamformer parameters may control either the width of the beam, or the direction in which the beamformer points, or both. The control may be asserted by the following means: 1) embedding switches within the PAA and using such switches to reconfigure conductive elements which comprise the PAA; 2) phase-shifting the signals sent to or received from elements of the PAA; and/or 3) digitally generating incremental delay among the signals sent to individual antenna elements.

Crosstalk among the beams is reduced by in the following ways. First, the physical design of the panels minimizes the level of Tx fields that are seen by Rx PAAs. Second, reflectors of millimeter-wave radiation may be embedded within the panels 7100, 7200. Thickness of the reflectors is optimized and simulated in order to ensure that the efficiency benefit gained thereby is not cancelled by the signal degradation caused by multipath propagation introduced by said reflectors. And third, attenuators may be embedded within the panels. The attenuators may be implemented as metamaterials or by conventional lossy materials.

Each PAAX may include beamforming-control circuits, transmitter-drive circuits, RF lens and enclosure elements.

Design of the V-Band and E-Band antennas used within the PAAXs is now discussed. In some configurations, there is no need for a Tx/Rx switch because Tx and Rx antenna elements are implemented as subarrays within each PAAX. Elimination of Tx/Rx switch results in elimination of losses and parasitics associated with the switch. Consequently, link margin is improved.

Each PAAX may be an adaptive array system, which uses adaptive nulling, beam forming, and beam steering. Because antenna elements as well as transceiver elements are embedded within each PAAX, there may be no need for a power combiner or transmission line in the Tx antenna array. Economic costs and performance degradation associated with the power combiner and said transmission line can thus be avoided. Each antenna may be a dedicated integral phased array antenna as defined by European Telecommunications Standards Institute (ETSI). It features dynamic auto-alignment and installation alignment. The antenna is not required to be a stand-alone antenna or a selectable beam antenna. However, some configurations of the system 7000 can be built using selectable beam antennas or stand-alone antennas.

In other embodiments, each panel 7100, 7200 may have a greater or fewer number of PAAXs and each panel 7100, 7200 may have a different number of PAAXs than the other panel.

Figure 12:
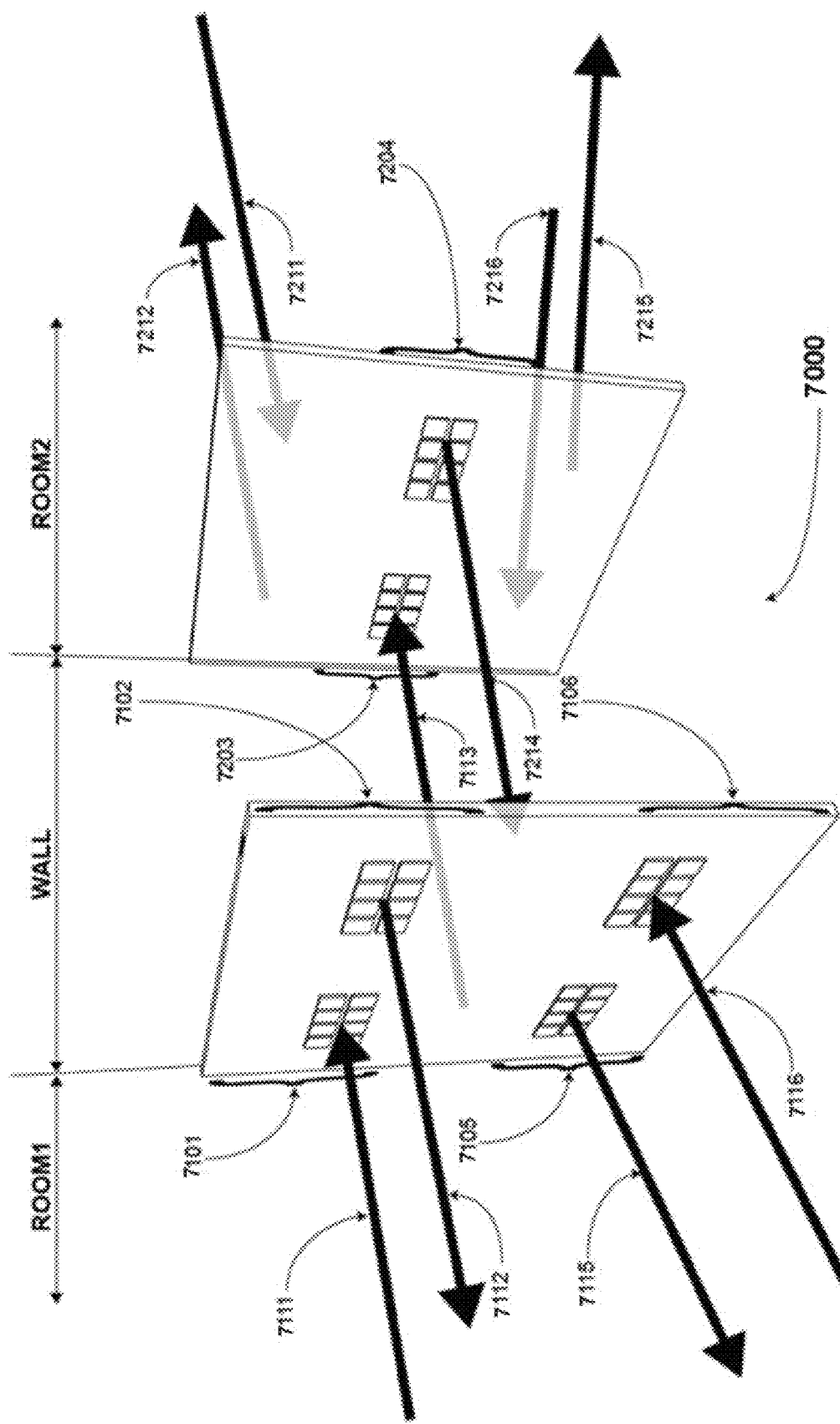
FIG. 12 is a second schematic perspective view of the exemplary wireless communication system of FIG. 11.
Figure 13:
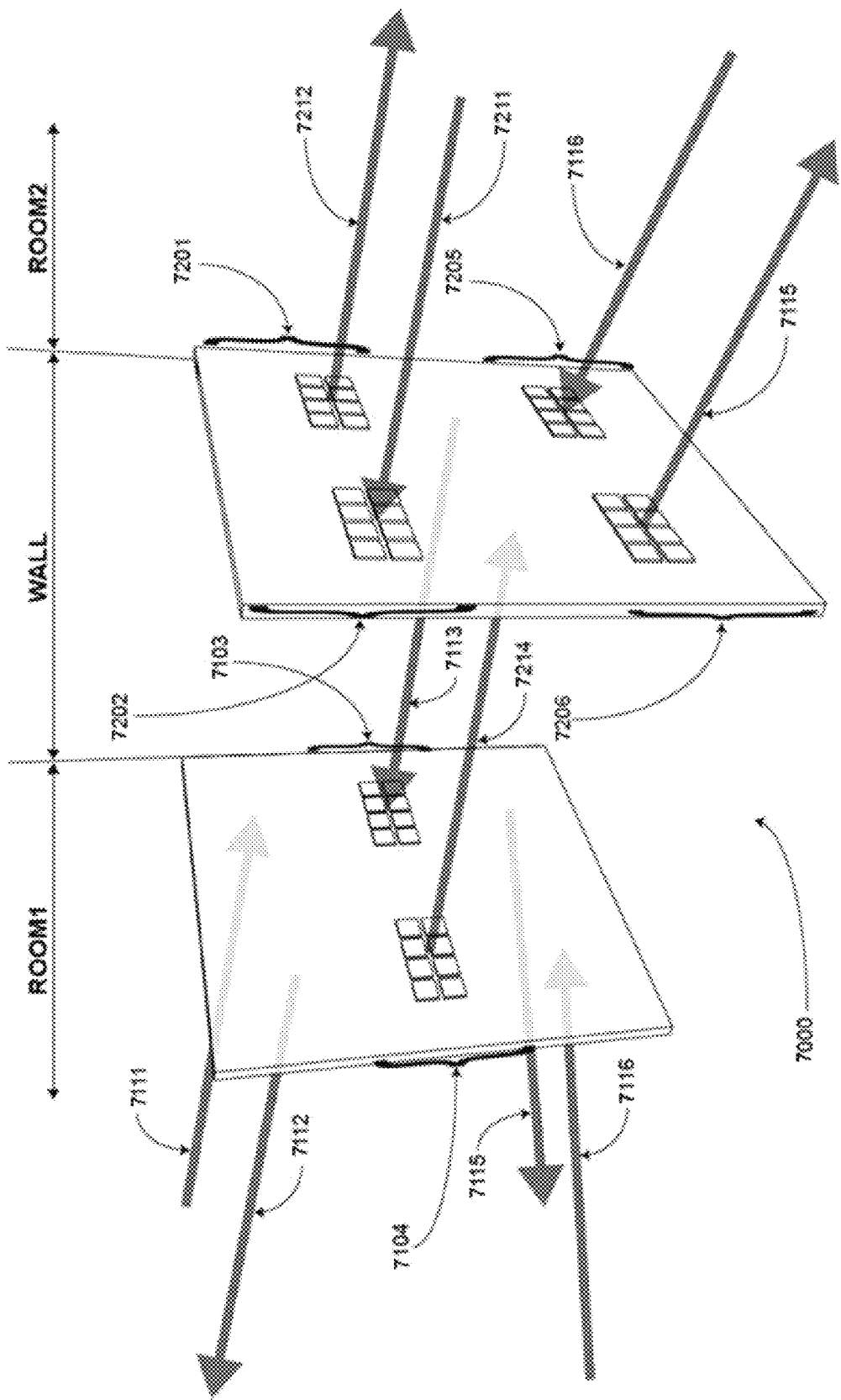
FIG. 13 is a third schematic perspective view of the exemplary wireless communication system of FIG. 11.

FIGS. 12 and 13 are second and third schematic perspective views, respectively, of the second exemplary wireless communication system 7000. These views show further details of the wireless beam data flows and structure of the system 7000. Table 2 summarizes the panels and their transmit (Tx) and receive (Rx) components by the element numbers shown in FIGS. 12 and 13, along with the element numbers of the corresponding millimeter wave beams.

TABLE 2

Rx and Tx components of panel.

| panel | Ref number | Frequency <GHz> | function | direction | Beam number | PAAX number |
|---|---|---|---|---|---|---|
| 7100 | 7101 | 81-86 | RX | Room 1 | 7111 | 7140 |
| 7100 | 7102 | 71-76 | TX | Room 1 | 7112 | 7140 |
| 7100 | 7103 | 81-86 | TX | Wall | 7113 | 7150 |
| 7100 | 7104 | 71-76 | RX | Wall | 7214 | 7150 |
| 7100 | 7105 | 60 | TX | Room 1 | 7115 | 7160 |
| 7100 | 7106 | 60 | RX | Room 1 | 7116 | 7160 |
| 7200 | 7202 | 71-76 | RX | Room 2 | 7211 | 7240 |
| 7200 | 7201 | 81-86 | TX | Room 2 | 7212 | 7240 |
| 7200 | 7203 | 81-86 | RX | Wall | 7113 | 7250 |
| 7200 | 7204 | 71-76 | TX | Wall | 7214 | 7250 |
| 7200 | 7206 | 60 | TX | Room 2 | 7215 | 7260 |
| 7200 | 7205 | 60 | RX | Room 2 | 7216 | 7260 |

In the example system 7000 shown in FIGS. 12 and 13, there are six wireless links, each having a pair of beams. There are two links per room, and two links through the wall. As shown in FIG. 12, in the first link wireless beams 7111 and 7112 carry traffic, including data and control information, that is flowing between the system 7000 and other wireless communication system(s) located within room 1. In this example, the traffic is transmitted and received at E-Band frequencies, for example, those shown in Table 2. Also at E-Band frequencies, beams 7113 and 7214 of the second link carry information which flows through the wall between the panels 7100 and 7200 located in room 1 and room 2. Beams 7212 and 7211 of the third link carry traffic which is flowing between the system 7000 and other system(s) in room 2. The traffic carried by the first, second and third wireless links may be transmitted and received at E-Band frequencies, as shown in Table 2. In this example, beams 7115 and 7116 of the fourth link carry traffic at V-Band frequencies flowing between PAAX 7160 of the first panel 7100 and terminal access points within room 1. Also in this example, beams 7215 and 7216 of the fifth link carry traffic at V-Band frequencies flowing between PAAX 7260 and terminal access points within room 2.

Each of the panels 7100, 7200 includes a plurality of millimeter-wave receivers (Rx's) and a plurality of millimeter-wave transmitters (Tx's). The phased-array antennas of each panel 7100, 7200 may be permanently electrically connected to either Rx or Tx RF front end circuitry, respectively. Correspondence between RF circuits 7101-7106 and 7201-7206 and area of the panels is shown in FIGS. 12 and 13 and given in Table 2.

Each of the Rx circuits 7102, 7103, 7106, 7203, 7202, 7205 generates a respective digital bit stream that corresponds to the waveform of the millimeter-wave signal (beams) incident on the corresponding antenna array. Error correction may be performed on each of the bit streams within the transceiver associated with the PAAX that contains the Rx circuit.

The data flow through the wall uses the second wireless links represented as beams 7113 and 7214. In order to reduce attenuation and other forms of signal degradation, the beams 7113, 7214 are generally normal to the surface of the wall. PAA elements of each PAAX 7150, 7250 of the panels 7100, 7200 are aligned to ensure that each Rx PAA captures the greatest possible proportion of the energy emitted by corresponding Tx PAA of the opposing panel. The proportion of energy received may depend on the exact shape of beams generated by the Rx and Tx PAAs on the panels 7100, 7200. Link margin can be adjusted by modifying the antenna gain, power and noise figure of the Rx PAA and corresponding Tx PAA. For example, antenna gain can be increased by using a larger number of elements within either or both corresponding PAAs of a given beam path. Data passing through the wall may transmitted wirelessly using E-Band.

The system 7000 contains digital circuitry for management of dataflow between bitstreams of the various Rx circuits and digital inputs of the Tx circuits. The digital circuitry also provides leaf-level management of beamforming activity and system power. The digital circuitry may include one or more controllers in each panel 7100, 7200, such as the control described in connection with FIG. 1.

Other configurations of the disclosed wireless systems are possible. For example, the PAAXs in each panel, as well as the other components, can be placed in different physical arrangements on the panels. For instance, the PAAXs can be arranged so that their antenna pairs are stacked vertically, rather than horizontally as shown in the figures.

Figure 14:
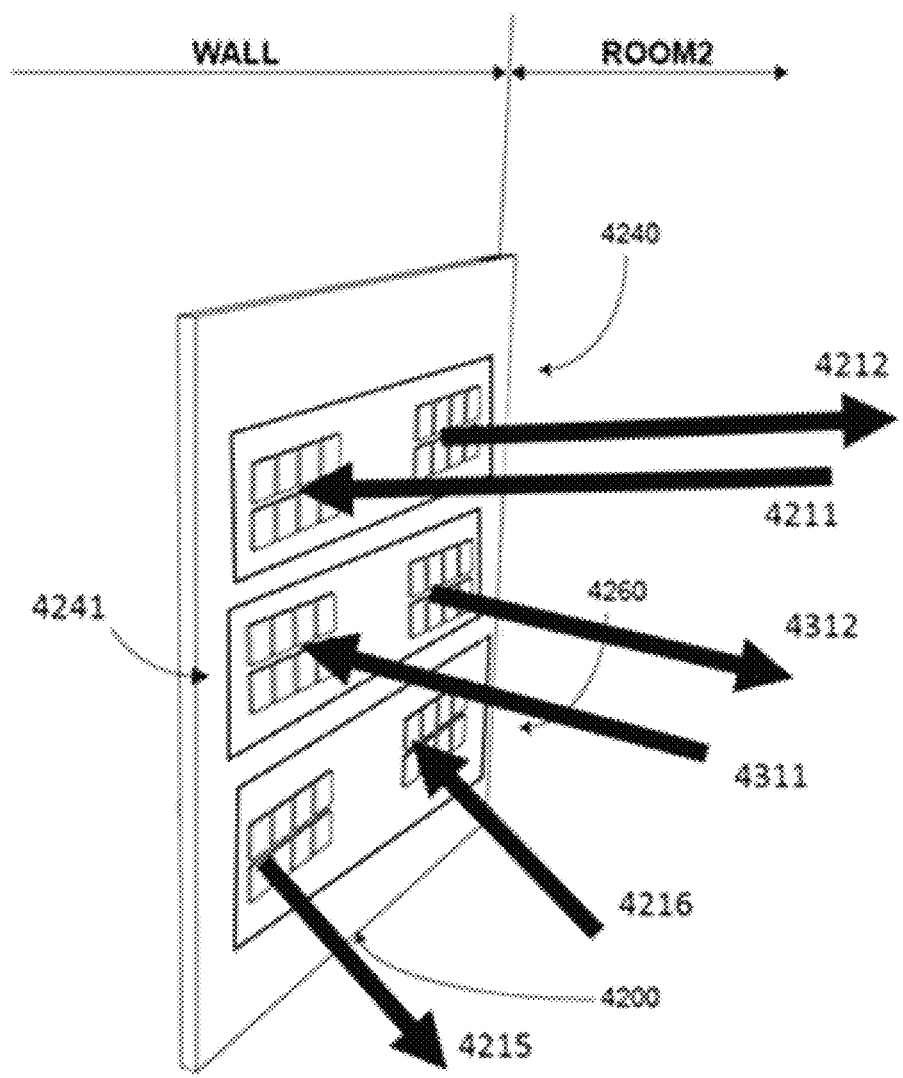
FIG. 14 is a schematic perspective view of another exemplary wireless communication system includable in the wireless networks disclosed herein.

FIG. 14 is a schematic perspective view of another exemplary wireless communication system 4400. Referring to FIG. 14, panel 4400 may be used independently as a single panel to "reflect" or divert traffic back into the room in which the received signal originated. This function is especially useful when significant beam angles are required, such as steering a beam around a corner.

Similar in function as PAAX module 4240, PAAX 4241 receives the V-Band traffic directly from PAAX 4240, but rather than carry the traffic of beams 4212 and 4211 through the wall side (opposite side) of the panel 4400, PAAX 4241 returns the wireless traffic through beams 4311 and 4312, respectively, and links to another wireless system within Room 2, instead of through the wall. Beams 4312 and 4311 may carry the same V-Band traffic as 4211 and 4212.

The other disclosed wireless systems, e.g., system 100, may be alternatively configured in like manner with the spine wireless links all facing away from the same side of the panel so that wireless traffic is reflected or diverted back into the room in which the received signal originated.

Figure 15:
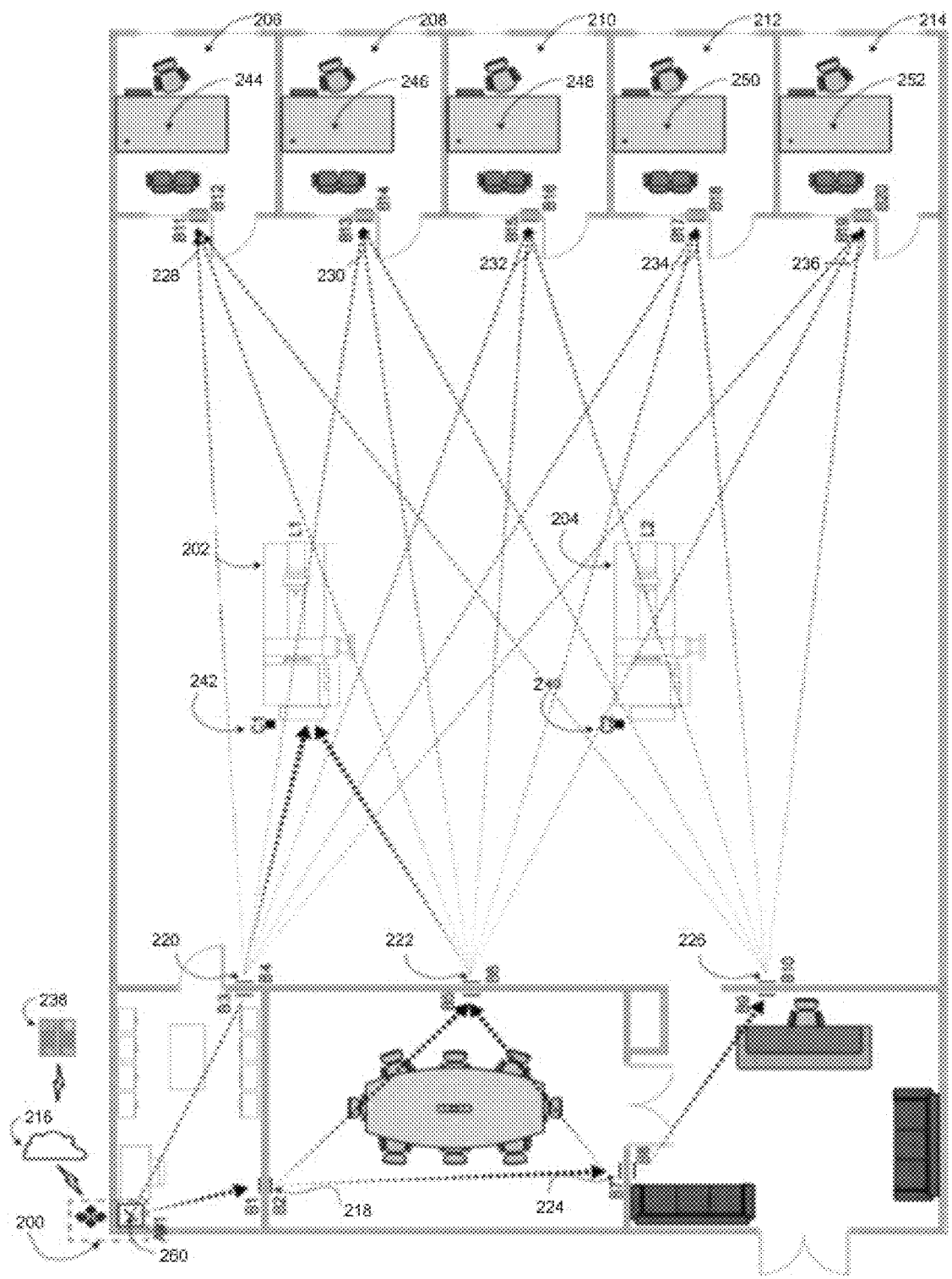
FIG. 15 is a contextual schematic illustration of another exemplary wireless communication network in an enterprise environment.

FIG. 15 is a schematic top plan view of another exemplary wireless communication network in an enterprise environment, for example, a light-manufacturing enterprise. The enterprise may use high-speed wireless data for a variety of machinery (shown as machine 202 and machine 204), and personal work areas 206-214 distributed throughout the enterprise, at data rates of up to 20 Gbps or more. In some embodiments, it is desirable that the high-speed, wireless data be provided securely to the machines and workstations as well, to prevent eavesdropping. An enterprise gateway 200 may provide secure, high-speed wireless communications to the machines and the work areas. Enterprise gateway 200 may include a high-speed modem, switch, router or the like, capable of very high data rates (20 Gbps or more), coupled to a wide-area network 216, such as the Internet, a datacenter, another gateway located in another building, and/or one or more wired or wireless legacy local-area networks.

The enterprise gateway 200 may further include a means for wirelessly communicating data traffic into the enterprise, for example, a wireless transceiver and one or more antennas, such as a directional phased array antenna transceiver (PAAX) 260. The PAAX 260 may include integral support electronics, such as power amplifiers, millimeter-wave transceivers, beamformers, controllers, filters, modems, and memory elements. The PAAX 260 may also include one or more RF lens elements which improve antenna efficiency and directionality. The PAAX 260 generally communicates line-of-sight or by wire with one or more wireless systems, e.g., any of the disclosed wireless communication systems 100, 4000, 4400, 5000, 7000, within the same room as the gateway 200, such as wireless systems 218, 220 in FIG. 15, forming a high speed data "trunk" or link. As shown, the gateway communication with panel B1 of the system 218 and panel B3 of system 220. The wireless systems can form beams of millimeter-wave radiation and direct the beams over a range of angles. The range of angles may be between +/−50 degrees (horizontal) and +/−30 degrees (vertical). The width of any of the beams may be one degree or more. The directions of emission of the beams is controlled by electrical control signals within the PAAX 260 that configure the phased array antenna(s).

Each of wireless systems 218, 220 begins a process of reception in one room, retransmission through a wall, and retransmission to other wireless communication systems in adjacent rooms. This process can be replicated, allowing high data rate signals from enterprise gateway 200 to propagate through multiple walls without degradation to multiple receivers or transceivers located throughout a large area, such as a manufacturing facility, office building, warehouse, retail store, apartment building, mall, arena, or the like.

A routing table is used by enterprise gateway 200 and/or a server 238 coupled to enterprise gateway 200 in order to efficiently route communications between enterprise gateway 200 and one or more intended recipients, such as machines 202, 204 (associated with wireless systems 240, 242, respectively) and end-user terminals 244-252 (associated with wireless systems 228-236, respectively). Communications may be routed depending on a number of factors, such as present capacity on the various wireless communication systems based on a quantity of data being processed by any of the wireless communication systems at any given time. The routing table may include a variety of information, such as a list of available wireless communication systems in the system and beam angles, distances between wireless communication systems, power levels needed to achieve various bandwidths, bandwidth capabilities of each wireless communication system, security settings, node identity info, and/or other information.

The enterprise gateway 200 may be programmed to deliver near real-time reconfiguration of the network, links, services, and capacity and may reduce capital expenditure through a closed loop automation approach that provides dynamic capacity and consistent failure management when and where it is needed.

The enterprise gateway 200 and/or a server 238 coupled to enterprise gateway 200 routes data through the enterprise network by forming data packets. Each data packet comprises a payload section and one or more sections denoting a routing path and/or addresses as determined by the routing table. In the case of data being delivered to end devices such as 202-204 or 244-252, data is received from one or more external sources, such as web servers, personal computers, a cloud, the Internet, or the like and provided to enterprise gateway 200 and/or server 238. Often, the data is in the form of TCP/IP packets. The gateway 200/server 238 may format the data to suit a particular end device, such as a particular type of machine or computing device that receives data from a wireless communication system. In any case, the data received by the gateway 200/server 238 may be packetized into a format for transmission across the enterprise network. This may include encapsulating the data into packets having a source address, destination address, and one or more addresses that denote which wireless communication system to transmit to next. The routing table discussed earlier is used to instruct each wireless communication system in the transmission path determined by the routing table where to point its wireless beams, i.e., toward another wireless communication system located on an opposing wall or in some configurations, to a work station or machine or other end point.

Once a packet is complete, it may be scheduled for transmission by gateway 200/server 238 along with other packets waiting for transmission. Gateway 200 is typically able to transmit multiple data streams simultaneously to multiple recipients.

In one configuration, scheduling the packets includes combining or interleaving the packets with other network traffic. For example, "fill packets" may be generated by gateway 200/server 238 during low-traffic conditions in order to confuse potential eavesdroppers.

Still referring to FIG. 15, communication paths may be determined by server 238, gateway 200, one or more wireless communication systems 218-226, 240-242, 228-236, and/or one or more end-user terminals. In one embodiment, a "Self-Organizing Network" protocol (SON) is used by one or more of the server 238, gateway 200 and/or one or more wireless communication systems 218-226, 240-242, 228-236 to determine things such as bandwidth usage by each wireless communication system, signal quality, or the like. Using this information, the server, gateway and/or one or more wireless communication systems may re-provision one or more wireless communication systems and perform load-balancing calculations in order to maximize the efficiency of the network. For example, in some exemplary embodiments, a SON protocol based on an open-source platform, such as AT&T ECOMP (Enhanced Control, Orchestration, Management & Policy) platform may be used. The ECOMP software platform delivers product/service independent capabilities for the design, creation and lifecycle management for carrier-scale, real-time workloads. It consists of eight software subsystems covering two major architectural frameworks: a design time environment to design, define and program the platform, and an execution time environment to execute the logic programmed in the design phase utilizing closed-loop, policy-driven automation.

In some configurations, an end-to-end path is chosen by an "originating device," such as server 238 or gateway 200, using the SON protocol, based on information in the routing table. The originating device then provides instructions to each of the room-facing wireless communication systems in the chosen path of where to point their wireless antennas in order to communicate with either another room-facing wireless communication system or an end user device. Each room-facing wireless communication system provides information to the routing table indicative of other wireless communication systems through which communications are possible. The information may include phase information that defines a physical angle from the panel face of a room-facing wireless communication system at which communications with another room-facing wireless communication system is possible. Other information may include acquisition and signal routing protocols. This information may be obtained during an initialization process once a number of wireless communication system pairs are installed in a building. In other words, from the SON instructions, wireless communication systems will connect to other wireless communication systems, creating a programmable set of wireless links resulting in a communication path to an end device. Other features such as upstream and downstream bandwidth allocation, security, or the like may also be determined by an originating device.

In some configurations, the wireless communication systems may aid in determining a communication path between an originating device and one or more end terminals, based on current communication conditions. For example, a stream of data may be sent from the gateway 200 to the wireless communication system 218, the stream containing identifying information of an end device to which the data stream is intended. The PAAX of panel B1 of wireless communication system 218 receives the stream, and transmits it through the wall to PAAX B2 of system 218. Wireless communication system 218 may include a routing table stored in memory, obtained using the SON protocol, that lists other room-facing wireless communication systems, e.g., systems 222, 224, able to communicate with wireless communication system 218 and phase information defining a beam angle for each of the other room-facing wireless communication systems. Each of the other room-facing wireless communication systems listed in the routing table typically includes information pertaining to other room-facing wireless communication systems through which they may communicate. In other words, each room-facing wireless communication system in a system may include a routing table that allows each wireless communication system to determine one or more paths to reach an adjacent intended recipient in the wireless network.

For example, in FIG. 15, if a data stream is intended for wireless system 242, wireless communication system 218 may communicate with room-facing wireless communication system 222 or 224. Wireless communication system 218 knows that the data stream can reach transceiver 242 via multiple wireless communication system routes because its routing table lists wireless communication system 222 as a potential communication device, and wireless communication system 222 also lists the ability to communicate with transceiver 242. Similarly, the routing table stored in wireless communication system 222 lists wireless communication system 224 as a potential communication device, one that also lists the capability of communicating with wireless communication system 226, which in turn lists transceiver 242 as an available device for communication. Thus, each wireless communication system in the network may store a routing table that lists other wireless communication systems or end devices through which communications are possible.

Each wireless communication system 218-226, 240-242, 228-236 in the network may be able to re-transmit signals received in a room to another wireless communication system in the same room.

Figure 16:
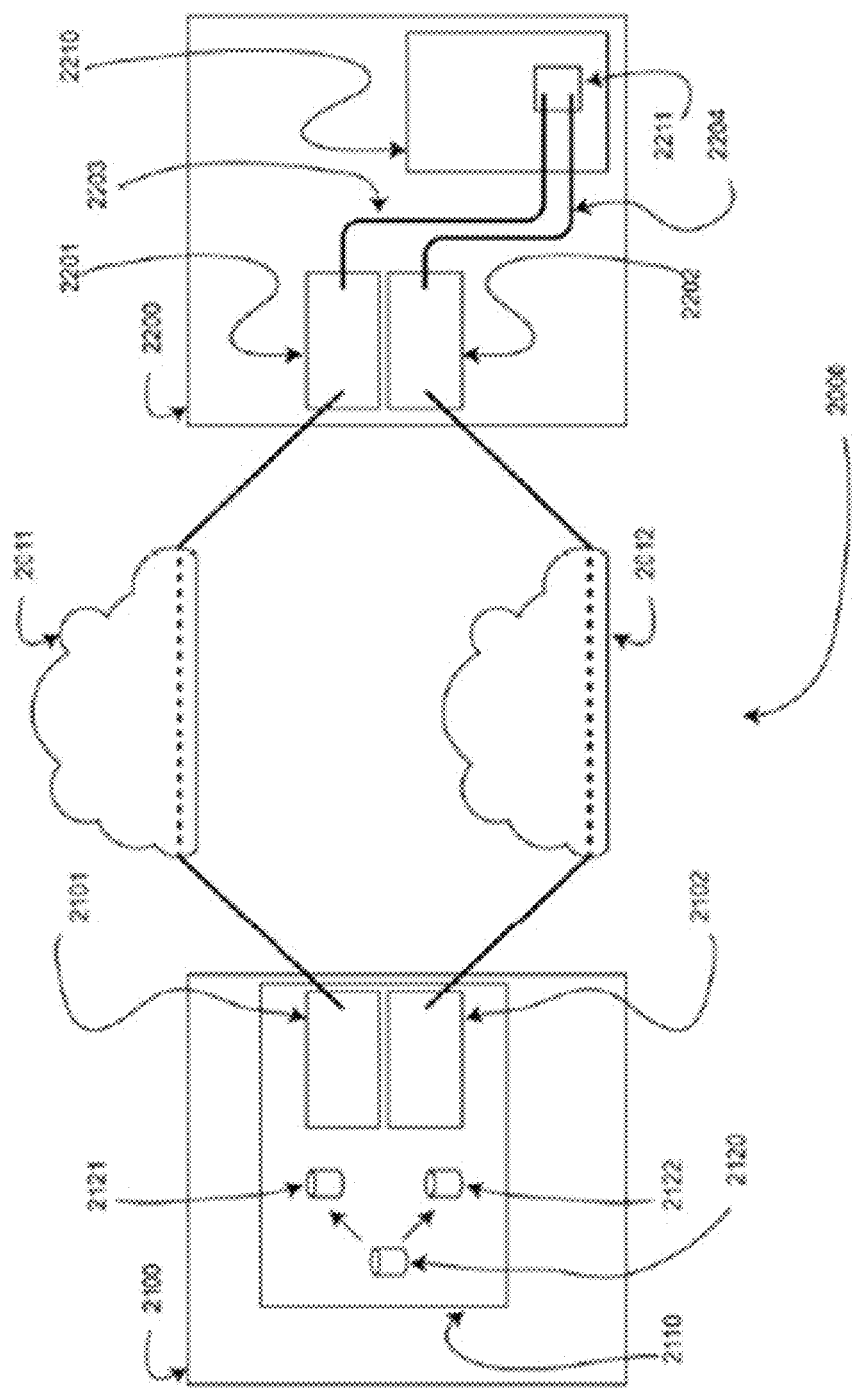
FIG. 16 is a schematic illustration of an exemplary distribution network for high-value content.

FIG. 16 is a schematic illustration of an exemplary distribution network 2000 for high-value content. The network 2000 enhances data security so that secrecy cannot be easily compromised by eavesdropping. FIG. 16 shows an exemplary functional block diagram showing a datacenter 2100 used for distribution of high-value content. It is desirable that this content not be vulnerable to eavesdropping. An exemplary high-value content is a digital database 2120 containing one or more feature films, which is about to be released after investment of a hundred million dollars. In this example, the database is being distributed to conference room 2210, located in enterprise 2200. The distribution uses gateways 2101 and 2102 of datacenter 2100 and gateways 2201 and 2202 of enterprise 2200.

The datacenter 2100 contains a vault 2110. The vault 2110 is secure against theft and eavesdropping. The database 2120 includes information that is to be served securely to conference room 2210. In this example, within vault 2110, database 2120 is used to generate two files 2121 and 2122 of content or data. The two files are encrypted using a robust algorithm such as Diffie-Hellman two-key authentication. The encryption is defined by the fact that it is computationally infeasible to produce any readable portion of the source database 2120 without possessing both encrypted files. A computer or server (not shown) in the vault 2110 may be used to encrypt the files 2121, 2122 using commercially-available encryption applications.

Encrypted files 2121 and 2122 are sent via gateways 2101 and 2102, respectively. The files travel over two communication networks 2011 and 2012 and are received via gateways 2201 and 2202, respectively, of enterprise 2200. The files travel on communication paths 2203 and 2204 within enterprise 2200. Each of the paths 2203, 2204 may be a series of wireless links. For example, the wireless links may be implemented using any of the wireless communication systems or networks disclosed herein. Paths 2203 and 2204 may be orthogonal in the sense that they share no common links. The encrypted files are received by an end device 2211, within conference room 2210. Any eavesdropper who intercepted any portion of either file 2121 or 2122 would be unable to decrypt any portion of source database 2120. Only when both of the encrypted files have been assembled in a single end device does it become possible to decrypt. Although the above example deals only with one-way transmission of data, this method allows encryption of two-way communication channels. The end device may be any of the end devices disclosed herein, configured to decrypt the files using, for example, a commercially-available encryption application.

The foregoing encryption and security scheme may also be deployed within a single indoor building or multi-building campus environment.

Figure 17:
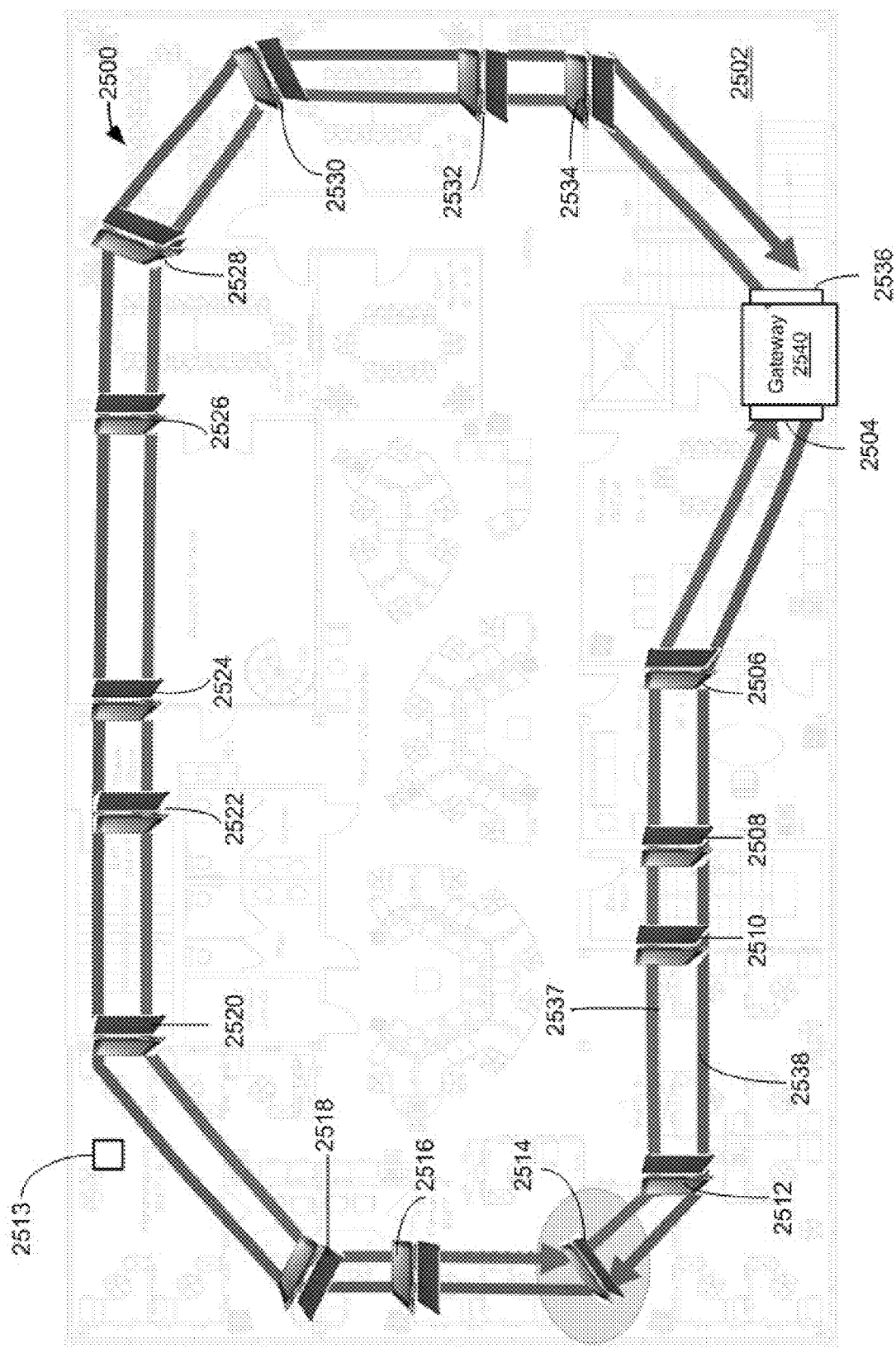
FIG. 17 is a contextual schematic illustration of an exemplary dual-ring wireless communication network in an enterprise environment.

FIG. 17 is a top plan view of an exemplary dual-ring (aka dual-loop) wireless communication network 2500 in an enterprise environment, for example, an office building 2502 where an enterprise gateway 2540 communicates with one or more end devices via the dual-ring network 2500 using wireless signals, for example, at E-Band or V-Band of up to 40 Gbps and beyond, at certain distances, through walls and across open floor space. The gateway 2540 may be the same as or similar to the gateway 200 described in connection with FIG. 15.

The network 2500 includes the gateway 2540 and a plurality of nodes 2504-2536, where each node may include one or more of the wireless communication systems disclosed herein, e.g., systems 100, 4000, 4400, 5000, 7000 or any the wireless communication systems having rotatable supports disclosed herein. For example, each node may include a single panel or a pair of wireless communication system panels, or more. In the example shown, each node includes a two-panel wireless communication system, such as any of those disclosed herein. Each of the communication systems may be mounted to walls throughout the building 2502 to provide two, independent communication loops or rings 2537, 2538 to/from the gateway 2540 to/from end users located at various points throughout the building. The wireless communication panels of adjacent nodes can be arranged to provide a line of sight wireless link between the nodes and wireless penetration through barriers, such as walls, between panels of a node, as described herein.

Figure 18:
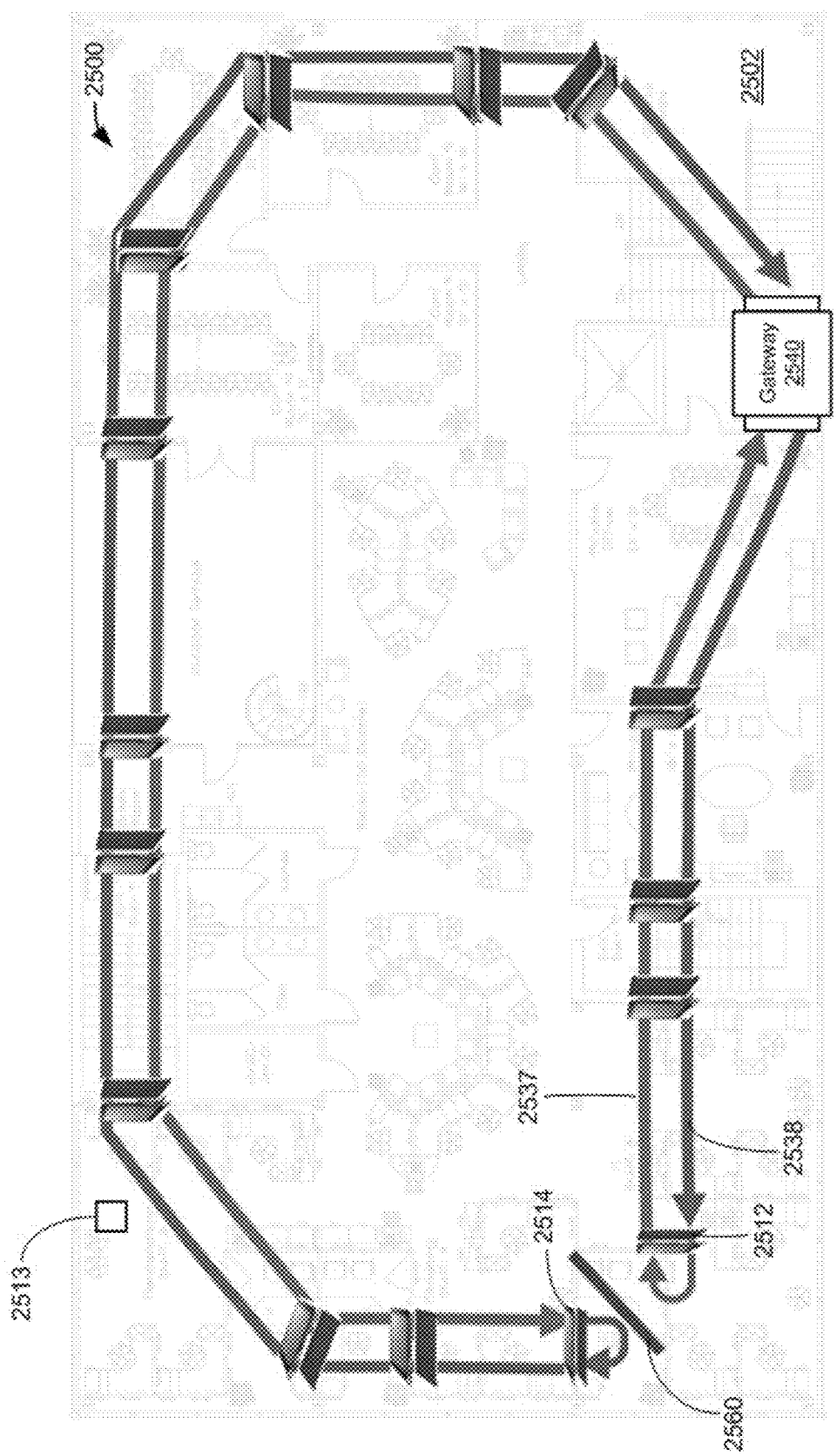
FIG. 18 illustrates how a link failure may be handled by the dual-ring wireless communication network of FIG. 17.

The dual-loop configuration provides at least two benefits. First, data may be transmitted/received redundantly on the two loops to provide resiliency in case one of the paths becomes blocked or otherwise becomes incapacitated (as shown in FIG. 18). Second, such a dual-looped network topology is suitable to support certain encryption protocols, for example, dual-key encryption schemes such as the Diffie-Hellman key exchange protocol.

The network 2500 includes the gateway 2540 and, in this example, fifteen nodes of wireless communication systems 2506-2534, each panel of the communication systems being mounted to a respective wall. The wireless communication systems 2506-2534 may be spread throughout the building as shown, or in different arrangements. Different numbers of nodes may be also be included in the network 2500.

The gateway 2540 may provide a link to a data network outside the building or elsewhere, such as a wired or wireless, high-speed link to one or more wide-area networks, such as the Internet, and/or to a data center specially purposed to support the data needs of users inside the building. In the example dual-ring network, the gateway 2540 is configured to provide two, independent, duplex, high-speed data loops or rings 2537, 2538, with loop 2537 providing data in a counter-clockwise fashion with respect to gateway 2540 and loop 2538 providing data in a clockwise direction. In other embodiments, three or more loops may be provided and included in the network 2500.

Each of the loops 2537, 2538 may provide a high-speed, wireless data channel, for example, a data channel at E-Band or V-Band. The high-speed, wireless data channels of the loops may include other frequency bands. Data rates of 40 Gbits/sec or more on each loop may be achieved using such high-frequency, millimeter-wave frequencies.

Data from gateway 2540 travels at extremely high data rates at millimeter-wave frequencies over loop 2538 clockwise, passing from gateway 2540 to node 2504 through to node 2536 and back to gateway 2540; while data transmitted from gateway 2540 travels over loop 2537 counter-clockwise, from node 2536 back to node 2504. Some nodes may provide only trunked communications (e.g., at E-band) with other nodes while other nodes may additionally provide communications to areas adjacent to the respective node using a local network interface, such as an end user device 102 located in an area adjacent to node 2520. Still other nodes may provide end device communications in areas on either side of a wall. The data transmitted between any node and an end device may be in accordance with any wireless standard, such as any variety of the IEEE 802.11 standard, or at much higher data rates, such as the newly emerging WiGig standard, offering data rates of 20 Gbits/sec or more. The aforementioned node functionalities may be achieved by including any of the wireless communication systems disclosed herein in the nodes.

In an example configuration of network 2500, data to and from gateway 2540 is transmitted/received "symmetrically", i.e., using the same frequencies and data rates in each of the loops 2538 and 2537. In other configurations, an asymmetric topology may be used. For example, data transmitted from gateway 2540 to end devices located in the building 2502 could be transmitted at E-band using WiGig drops to end devices in the various locations throughout the building, while data transmitted from end devices to gateway 2540 could be performed using much slower data rates, as the volume of data sent to end devices is typically far greater than the volume of data sent from end devices.

One advantage of the dual-ring topology shown in FIG. 17 is the ability to support certain encryption protocols, for example, in dual-key encryption schemes such as the Diffie-Hellman key exchange protocol. In such protocols, users typically exchange their public keys over an insecure channel. Using a dual-loop topology allows one user to transmit a public key over a first loop, such as loop 2538, while a second user transmits his or her key over a different loop, such as loop 2537. In this way, an eavesdropper listening to one of the loops would only intercept one of the two public keys. Two users may initially communicate with one another over one of the two loops and agree which user will use which loop in order to transmit a respective public key. Then, each user begins communicating on their agreed-upon loop. Each of their signals are ultimately received by gateway 2540, which then provides the respective public keys to the other user on an alternate loop.

The end-user terminal devices (e.g., device 2513) supported by the network 2500 may be any network enabled device, such as a computer, laptop, game console, smartphone, cable box, robotics equipment, high resolution monitors, virtual reality equipment, manufacturing equipment, or the like. End user terminal devices may also be intermediary connector, hub, or plug-in components specifically linked through wireless connections to the nodes. In this manner, the connectors, hub, or plug-in components are inserted or connected to other end-user terminal interface ports (located within computers, monitors, video equipment, or the like), such as Ethernet RJ-45 ports, or USB ports. In this manner, a networked end device connected to network 2500 may thereby act to terminate the wireless link from any of the nodes, and then repeat or transfer the communications streams into other end-user terminals by way of the interface ports.

FIG. 18 illustrates how a link failure 2560 may be handled by the dual-ring wireless communication network 2500 of FIG. 17. The dual-loop topology inherently provides spatial diversity, so that if an interruption occurs on one or more loops, communications are still possible by routing data communications over the other loop. This concept is shown in FIG. 18.

In FIG. 18, the same building 2502, gateway 2540 and nodes 2504-2536 are shown as in FIG. 17. In this case, however, a breakdown in the network occurs between nodes 2512 and 2514, preventing signals carried by loops 2538 and 2537 from being carried to/from their destinations. Such a breakdown may occur by a malfunction of one of the nodes or by an obstacle blocking a line of sight between nodes. In any case, one or both of nodes 2512, 2514 may determine that a link failure has occurred, for example, by detecting a lack of acknowledgement packets from a reciprocal node, loss of signal strength, loss of data packets, etc. When this occurs, each node may re-route data packets on one link and send them over the other link, sending the data packets back to gateway 2540. Alternatively, since each link is typically bi-directional, data packets may be re-routed back over the same link that they originated from. For example, in the case where gateway 2540 transmitted data packets destined for end user device 2513 over loop 2538, and a break 2560 in communications occur between nodes 2512 and 2514, node 2512 may re-route the data packets back to gateway 2540 via link 2537.

Node 2512 may provide an indication to gateway 2540 that a break in communications (link failure 2560) has occurred between nodes 2512 and 2514. To do this the wireless communication system of node 2512 may replace a "source" field in each data packet with a network address representative of node 2512. Similarly, node 2514, upon determining that a break in communications has occurred with node 2512, may re-route data packets from end user device 2513 over loop 2537 to loop 2538.

When gateway 2540 receives data packets that it previously transmitted over one of the loops, it re-transmits them using a different link to their destination. For example, gateway 2540 may transmit future data packets using the different loop, after receiving a message or indication that a link failure has occurred between nodes 2512 and 2514. For example, if gateway 2540 sent data packets to end user device 2513 over link 2538, but received the same data packets back from node 2512, the gateway 2540 may be configured to re-transmits the data packets to end user device 2513 over loop 2537; and any subsequent data packets for transmission from gateway 2540 to end user device 2513 may then be transmitted over loop 2537.

After the breakdown in communications is repaired or otherwise resolved, one or both of nodes 2512, 2514 may inform gateway 2540 that the communication path has been re-established by sending a predefined message, for example, or determined by gateway 2540 autonomously by determining that data packets transmitted to a destination are no longer being returned for re-routing.

Figure 19:
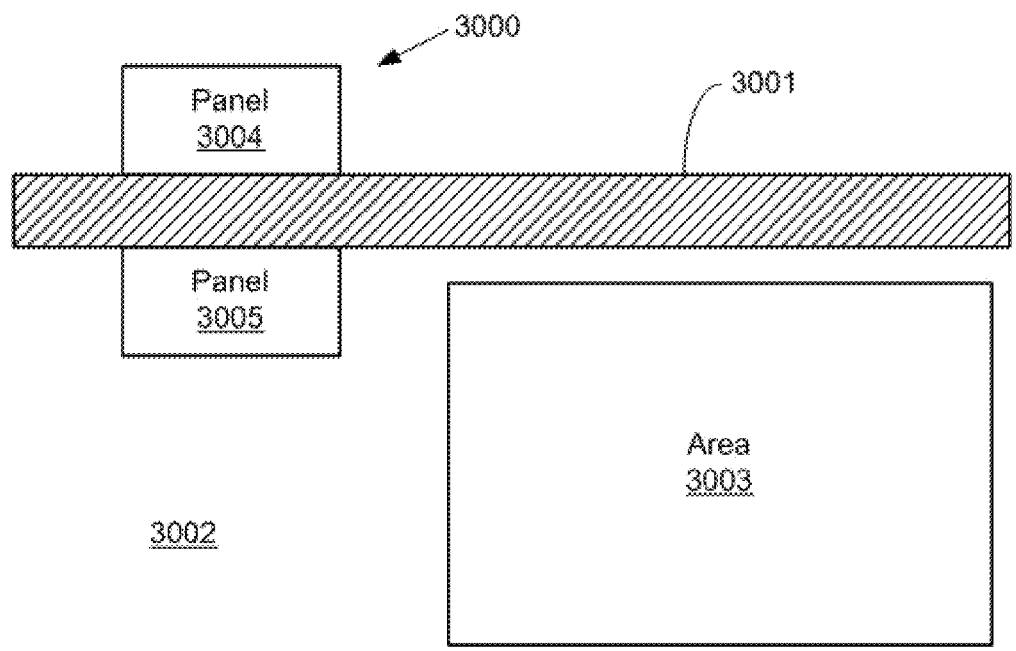
FIG. 19 is a contextual schematic plan view of a first exemplary wireless communication system having at least one rotatable support, which system is includable in the wireless networks disclosed herein.

FIG. 19 is a contextual schematic plan view of a first exemplary wireless communication system 3000 having a rotatable support, which system 3000 is includable in any of the wireless networks disclosed herein, including network 2500. The system 3000 may include any of the wireless communication systems disclosed herein configured to include at least one rotatable panel or support, as described here. The support may be a panel or any other suitable means of support, including those means disclosed above herein. FIG. 19 is a top view of two rooms separated by a wall 3001 on which a wireless communication system 3000 is mounted. The system 3000 includes a panel 3004 servicing room 1 and an adjustable panel 3005 servicing room 2 3002. The panel 3004 may connect the wireless communication system 3000 with a mm-wave gateway in an adjacent room, while the panel 3005 may distribute a local wireless network service, e.g., WiFi, WiGig or the like, or other connectivity to terminal devices within room 2 3002. The challenge in this scenario is to provide coverage over an area that includes the portion of room 2 immediately adjacent to the wall panel 3005, such as area 3003. The end terminal devices in area 3003 may not be able to obtain service from system 3000, due to the directional nature of mm-wave signals emanating from the panel 3005. Such directional signals may be limited to an angle incident with a surface of panel 3005, for example, 45 degrees or less. Thus, devices located outside of this angle (such as those located in area 3003) generally may not be able to efficiently communicate with the system 3000.

Figure 20:
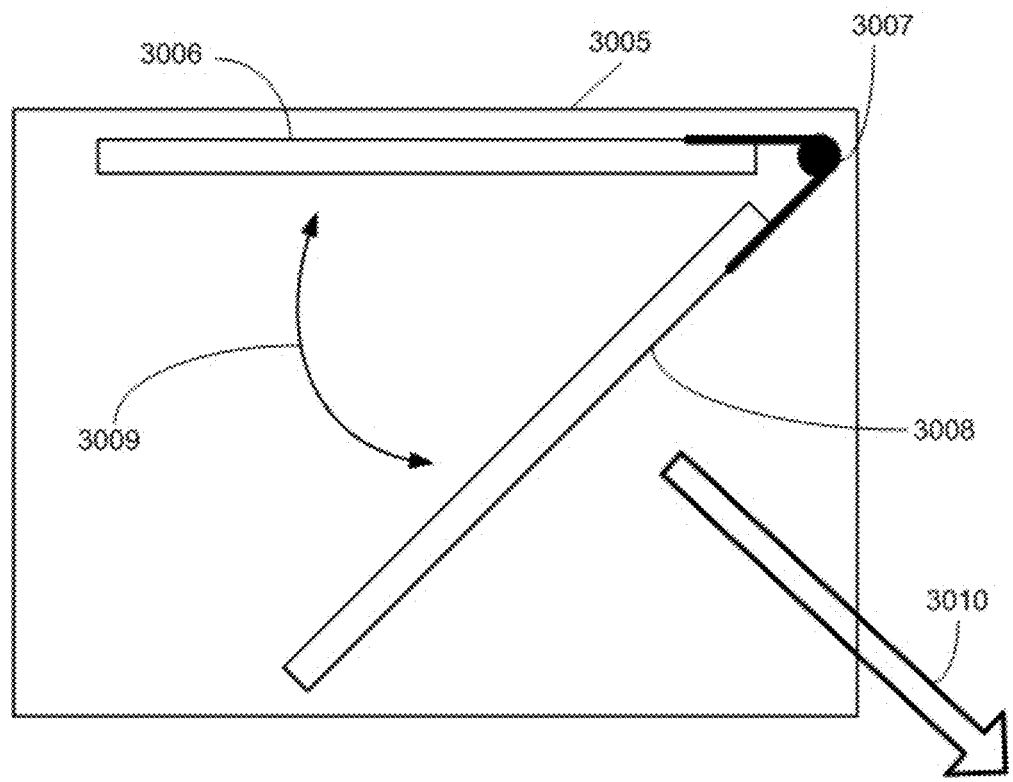
FIG. 20 is a schematic plan view showing details of the wireless communication system shown in FIG. 19.

FIG. 20 is a schematic top plan view showing details of the wireless communication system 3000 shown in FIG. 19. In order to address the coverage issue described above, the adjustable panel 3005 includes a means for rotating the direction of the panel 3005 so that the direction of the wireless signals to/from the panel 3005 can be changed and adjusted to a desired position. Any suitable structure can be employed for rotating or adjusting the angle or the panel 3005. For example, the panel 3005 may include two supports, e.g., sub-panels 3006, 3008, joined together, in this example, by hinge or pivot 3007 on one side or end of the sub-panels 3006, 3008. The sub-panel 3006 may act as a mount, being mounted to the wall 3001, and the sub-panel 3008 may be moved about hinge 3007. Sub-panel 3008 may include a PAAX which radiates/receives signal 3010 into a laterally-adjacent area of panel 3005 when the hinge 3007 is open, for example, area 3003 or FIG. 19, while another PAAX located on sub-panel 3006 may radiate/receive signals to/from panel 3004 through wall 3001. The hinge 3007 allows manual adjustment of an angle 3009 formed between the two sub-panels 3006, 3008. Adjustment of the angle allows the coverage area to be directed to any desired direction.

The sub-panels 3006, 3008 may be hinged together on the sub-panel right sides, as shown in FIG. 20, on the left sides, or center. Furthermore, a selectable dual-hinge may be deployed, which includes one hinge on each end of the sub-panels, allowing one sub-panel to swivel around either hinge by removing or disconnecting the unused hinge pin, thus allow one sub-panel to swivel around the axis of the other hinge pin that remains.

The hinge 3007 may include a conventional hinge structure having a pin connecting two or more flanges so that they may be rotated about the axis of the pin. The hinge 3007 may be implemented with frictional engagement in order to hold the sub-panels 3006, 3008 in a desired angle to each other, or other means can be used to achieve a fixed, angular relationship between the sub-panels, such as with one or more clamps, pins, adjustment bars, screws, or other physical constraints in order to assure that the desired angle between the sub-panels be permanently or adjustably maintained. Moreover, it should be understood that communication signals may be routed between sub-panel 3006 and 3008 via wired or wireless means, such as a flex cable or flex board having one or more traces connecting electrical components located on either sub-panel 3006, 3008.

The hinge 3007 may be mounted on different ends or sides of the sub-panels 3006, 3008.

During installation of adjustable panel 3005, angle 3009 may be set manually by an installation technician and then beamsteering techniques may be used to further adjust the exact direction of the signal 3010, if necessary. Adding a means of physically rotating the panel allows rapid compensation for geometric variations due to phenomena such as wind sway of a wall on which the system 3000 has been mounted. In some circumstances, narrow, pencil beam wireless signals may have widths on the order of one degree, and compensating for such variations in panel positioning so as to more precisely direct wireless signals may be desirable.

The panel 3004 may also be an adjustable panel including the components of panel 3005 shown in FIG. 20.

In some situations, a further motivation for being able to adjust angle 3009 may be that radiated power varies as the electrical beamformer nears the extremes of its angular range. Depending on exact design of the beamformer elements, said variation can exceed 40%.

Figure 21:
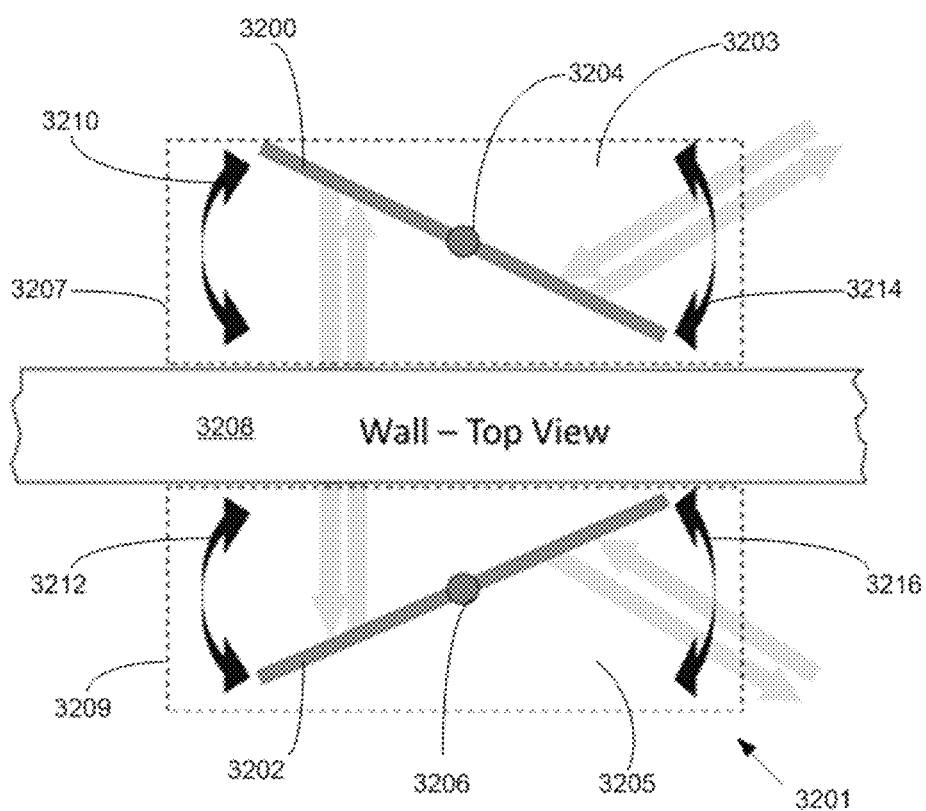
FIG. 21 is a schematic plan view of a second exemplary wireless communication system having rotatable supports, which system is includable in the wireless networks disclosed herein.

FIG. 21 is a schematic top plan view of a second exemplary wireless communication system 3201 having rotatable supports 3200, 3202, which system 3201 is includable in the wireless networks disclosed herein, including network 2500. The system 3201 may include any of the wireless communication systems disclosed herein configured to include at least one rotatable panel or support, as described here. The system 3201 include panels 3203, 3205. The panels 3203, 3205 each include a housing 3207, 3209 that may be mounted to opposite sides of the wall 3208. The rotatable supports 3200, 3202 are each rotatably mounted to their respective housing 3207, 3209 by way of pivots 3204, 3206, respectively.

Each of the supports 3200, 3202 are rotatably mounted to a pivot 3204 and 3206, respectively, near the lateral mid-point of each support, where pivot 3204 and 3206 each comprises a post, pin or other fixed, physical structure that allows the supports to rotate about a respective axis of each pivot. Each support 3200, 3202 may include two or more PAAXs, at least one room-facing PAAX mounted on one side of a support for communicating with terminal devices in a room and at least one wall-facing PAAX mounted on the opposite side of each support for providing communications through wall 3208. The wall-facing PAAXs may require beamsteering techniques, as the angle of the supports with respect to one another is not parallel. The physical angle 3210 and 3212 of each support with respect to wall 3208 may change the transmission/reception angles 3214 and 3216, respectively, formed by electronic beamforming techniques, thus allowing communications with end devices and/or other panels located in areas near wall 3208.

The housings 3207, 3209 may each be any suitable structure for mounting the panels to the wall 3208 while permitting the supports to rotate. For example, each housing may be a plastic or metal box frame having an open faces exposing the PAAXs. In other configurations the housings may be fully enclosed boxes or containers.

Figure 22:
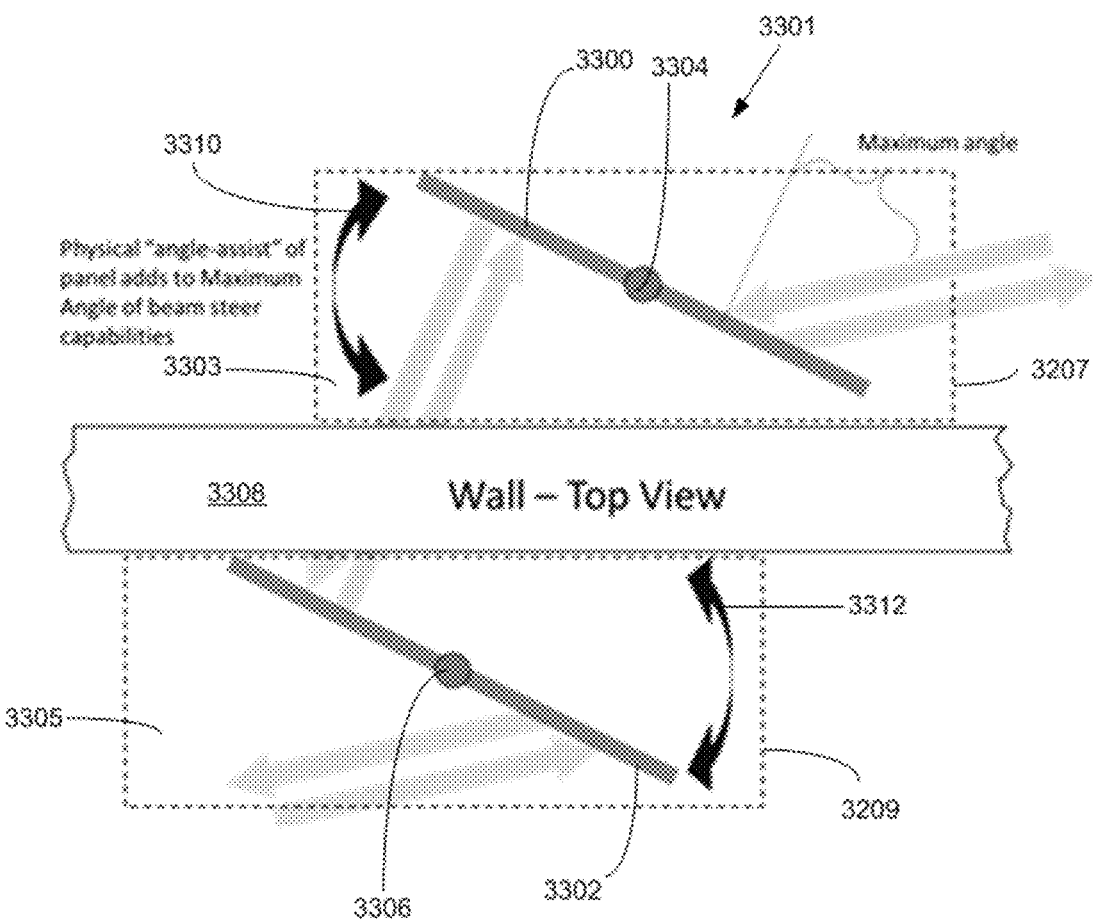
FIG. 22 is a schematic plan view of a third exemplary wireless communication system having rotatable supports, which system is includable in the wireless networks disclosed herein.

FIG. 22 is a schematic top plan view of a third exemplary wireless communication system having rotatable supports, which system is includable in any of the wireless networks disclosed herein, including network 2500. The system 3301 may include any of the wireless communication systems disclosed herein configured to include at least one rotatable panel or support, as described here. The system 3301 includes panels 3303 and 3305. As in FIG. 21, each of the supports 3300, 3302 in this configuration is rotatably mounted to a pivot 3304 and 3306, respectively, near the lateral mid-point of each panel, where pivot 3304 and 3306 may each include a post, pin or other fixed, physical structure that allows the supports to rotate about a respective axis of each pivot point. Also similar to FIG. 21, each support typically includes two or more PAAXs, at least one room-facing PAAX mounted on one side of a support for communicating with devices in a room and at least one wall-facing PAAX mounted on the opposite side of each support for providing communications through wall 3308. The physical angle 3310 and 3312 of each support, respectively, with respect to wall 3308 adds to the transmission/reception angle possible by electronic beamforming techniques, thus allowing communications with devices and/or other panels located in areas near wall 3308.

In the configuration shown in FIG. 22, the two panels are not aligned directly with each other. Rather, they are staggered horizontally from each other as shown, in order to reduce the angle to transmit/receive signals through wall 3308 from the surface of each support. In other words, no beamsteering is needed in this arrangement, as the wall-facing PAAX on both supports are generally parallel to each other. In other configurations, the panels may be staggered vertically or in any suitable orientation between horizontal and vertical.

Figure 23:
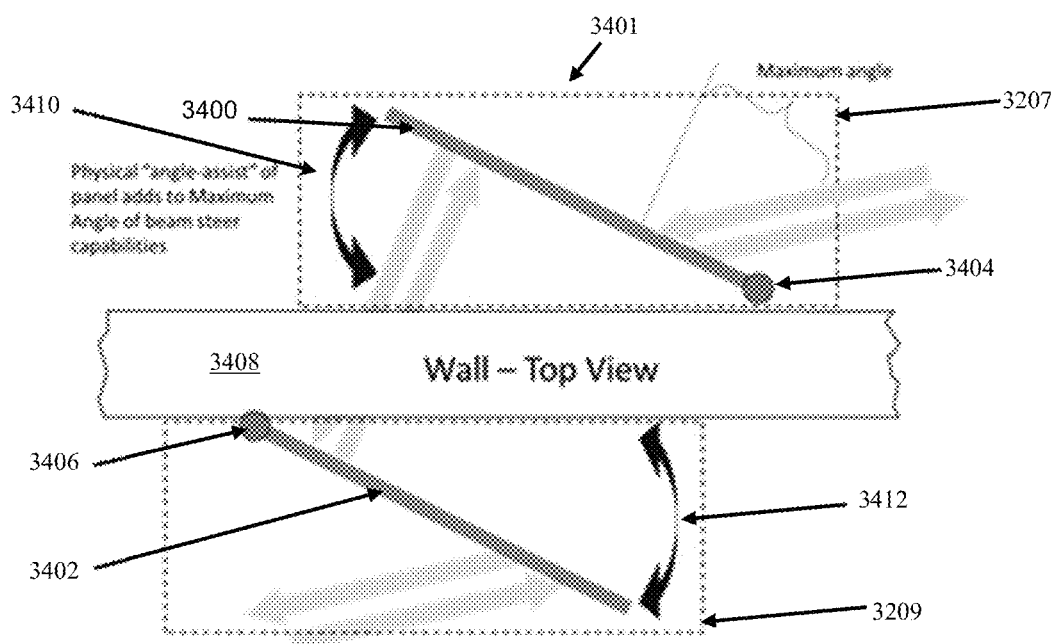
FIG. 23 is a schematic plan view of a fourth exemplary wireless communication system having rotatable supports, which system is includable in the wireless networks disclosed herein.

FIG. 23 is a schematic top plan view of a fourth exemplary wireless communication system 3401 having rotatable supports 3402, 3400, which system 3401 is includable in any of the wireless networks disclosed herein, including network 2500. The system 3401 may include any of the wireless communication systems disclosed herein configured to include at least one rotatable panel or support, as described here. The system 3401 include panels 3403, 3405 mountable on opposing sides of wall 3408. The panels 3403, 3405 each include a housing 3207, 3209 that may be mounted to opposite sides of the wall 3408. The rotatable supports 3402, 3400 are each rotatably mounted to their respective housing 3207, 3209 by way of pivots 3404, 3406, respectively.

In the system 3401, each support 3400, 3402 is rotatably coupled to pivots 3404 and 3406, respectively, on one side of each panel at the ends of supports 3400, 3402, where pivot 3404 and 3406 each comprises a post, pin or other fixed, physical structure that allows the supports to rotate about a respective axis of each pivot. Each support 3400, 3402 may include two or more PAAXs, at least one room-facing PAAX mounted on one side of a support for communicating with end devices in a room and at least one wall-facing PAAX mounted on the opposite side of each support for providing communications through wall 3308. As with the other systems described in connection with FIGS. 18-21, the physical angle 3410 and 3412 of each support, respectively, with respect to wall 3408 expands the transmission/reception angle possible by electronic beamforming techniques, thus allowing communications with devices and/or other panels located in areas near wall 3408.

Similar to the system shown in FIG. 22, each of the panels are staggered from one another horizontally on wall 3408, in order that the signals transmitted and received by the panels do not require beamsteering techniques, as the panels are generally parallel with each other. In other configurations, the panels may be staggered vertically or in any suitable orientation between horizontal and vertical.

Figure 24:
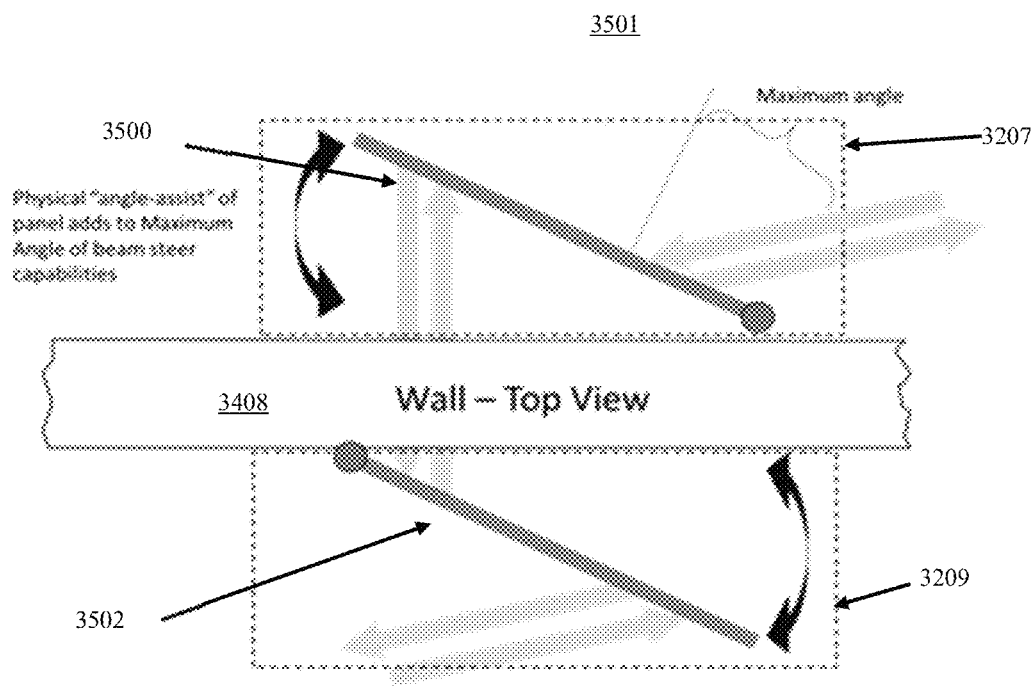
FIG. 24 is a schematic plan view of a fifth exemplary wireless communication system having rotatable supports, which system is includable in the wireless networks disclosed herein.

FIG. 24 is a schematic plan view of a fifth exemplary wireless communication system 3501 having rotatable supports 3500, 3502, which system 3501 is includable in any of the wireless networks disclosed herein, including network 2500. The system 3501 combines some of the features of FIGS. 20 and 22, where each of the supports 3500, 3502 are pivotally mounted to a pivot along one end of the support, and the panels are mounted on the wall in alignment with each other, rather than staggered. Generally, the signals transmitted and received between of the panels require beamsteering techniques, as the supports 3500, 3502 are not always parallel with each other.

Figure 25:
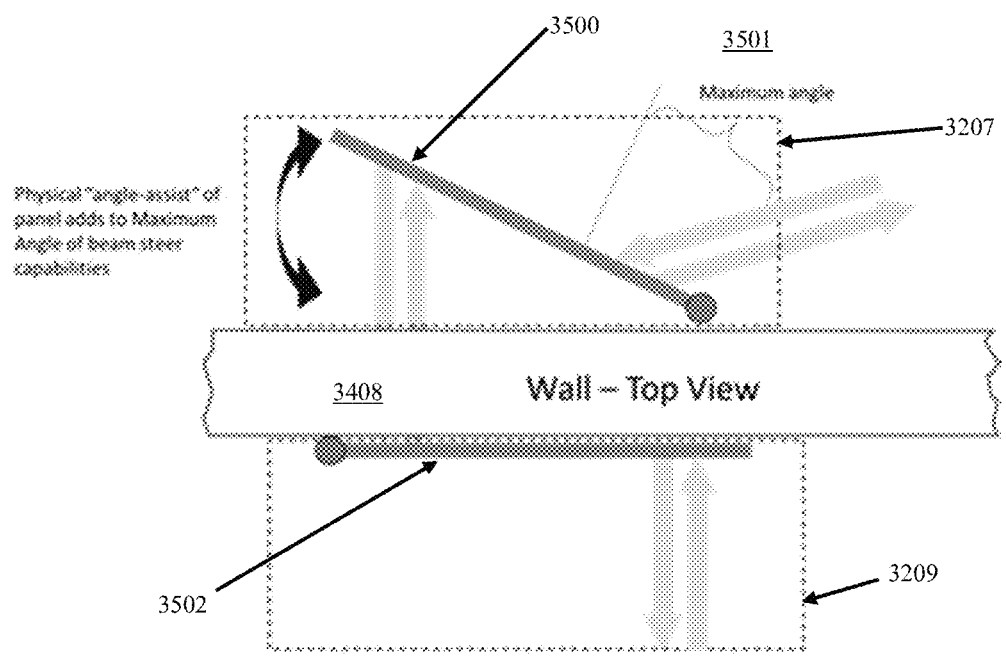
FIG. 25 is a schematic plan view of the fifth exemplary wireless communication system having rotatable supports where one of the panels is in a closed position.

FIG. 25 is a schematic plan view of the fifth exemplary wireless communication system 3501 having rotatable supports 3500, 3502 where one of the supports 3502 is in a closed position.

Similar to the systems shown in FIGS. 22 and 23, each of the supports are pivotally mounted to respective pivots 3404 and 3406. However, in this example, support 3500 is positioned at an angle to the wall, while support 3502 is positioned parallel to the wall. This arrangement generally requires no beamsteering for signals transmitted or received from/by a wall-facing PAAX located on the wall side of support 3502, and also no beamsteering techniques for communications with devices located in a room where support 3502 is located. On the other hand, a wall-facing PAAX mounted on one side of support 3500 generally transmits and receives signals using beamsteering techniques, due to the non-parallel relationship between supports 3500 and 3502. Beamsteering may or may not be used by a PAAX located on the opposite side of support 3500 to communicate with devices in a room where support 3500 is located.

In any of the adjustable wireless communication systems disclosed herein, one or more supports of the system may be electronically moved to a desired angle by the use of an electric motor mounted to the panel using conventional mounting techniques. Use of an electric motor may allow angle changes when needed to account for traffic conditions, outages in the network, or the like. During installation of a wireless communication system, the motor may be automatically controlled to position the supports in the most desirable angle in accordance with, for example, sample traffic generated by other wireless communication systems and/or end user devices. The physical angle at which each support resides can be measured by angle detection circuitry, such as commercially-available circuitry, and provided as part of beamsteering calculations.

In any of the systems described herein, a plurality of PAAXs may be used within one or more panels in order to increase the coverage range and/or area.

It should be understood that in various configurations of the systems described herein, the PAAXs may operate in one or more millimeter-wave bands in the range between 10 GHz and 300 GHz. Although specific embodiments described above may refer to E-band, V-band, WiGig, or the like, the concepts taught herein may be generally applicable to any millimeter-wave frequencies.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, rather than sequentially. In addition, while certain aspects of this disclosure are described as being performed by a single module or component for purposes of clarity, it should be understood that the functions described in this disclosure may be performed by any suitable combination of components or modules associated with a wireless data communication network or system.

The foregoing description is illustrative and not restrictive. Although certain exemplary embodiments have been described, other embodiments, combinations and modifications involving the invention will occur readily to those of ordinary skill in the art in view of the foregoing teachings. Therefore, the invention is to be limited only by the following claims, which cover one or more of the disclosed embodiments, as well as all other such embodiments and modifications when viewed in conjunction with the above specification and accompanying drawings.

What is claimed is:

1. A communication network, comprising:
   a plurality of nodes configured into a wireless millimeter-wave dual-ring network topology, wherein at least one of the nodes is configured to send and receive millimeter-wave signals through an obstruction that attenuates the millimeter-wave signals and includes:
   a first configurable phased array antenna to transmit a first millimeter-wave signal through the obstruction;
   a controller, coupled to the first configurable phased array antenna, for steering the first millimeter-wave signal;
   a second configurable phased array antenna to receive a second millimeter-wave signal through the obstruction; and
   wherein the first phased array antenna and the second phased array antenna are each configured, respectively, to mitigate path loss experienced by the first and second millimeter-wave signals passing through the obstruction.

2. The communication network of claim 1, wherein the nodes are configured to exchange a first encryption key of a dual-key encryption scheme over a first ring of the dual-ring network topology and a second encryption key of the dual-key encryption scheme over a second ring of the dual-ring network topology.

3. The communication network of claim 1, wherein at least one of the nodes is configured to re-route data from a first ring of the dual-ring network topology to a second ring of the dual-ring network topology upon detecting a link failure in the network.

4. The communication network of claim 1, further comprising a gateway included in the dual-ring network topology, the gateway including at least one communication link extending outside the dual-ring network topology.

5. The communication network of claim 1, wherein the nodes are configured into a ring network topology having three or more rings.

6. The communication network of claim 1, wherein at least one of the nodes includes:
   a first wireless transceiver;
   a first phased array antenna, operatively coupled to the first wireless transceiver, adapted to emit a first millimeter wave signal;
   a second phased array antenna, operatively coupled to the first wireless transceiver, adapted to receive a second millimeter wave signal;
   a second wireless transceiver;
   a third phased array antenna, operatively coupled to the second wireless transceiver, adapted to emit a third millimeter wave signal through the obstruction;
   a fourth phased array antenna, operatively coupled to the second wireless transceiver, adapted to receive a fourth millimeter wave signal through the obstruction; and
   a controller adapted to manage data transfer between the first wireless transceiver and the second wireless transceiver.

7. The communication network of claim 1, wherein the obstruction is selected from the group consisting of a building wall, building floor, a building ceiling, a barrier, and any combination of the foregoing.

8. The communication network of claim 1, wherein at least one of the nodes includes:
   a first wireless interface configured to wirelessly communicate with at least one of the other nodes by way of millimeter-wave signals; and
   a second wireless interface configured to wirelessly communicate with one or more end devices.

9. The communication network of claim 8, wherein the second wireless interface is selected from the group consisting of a millimeter-wave interface and a Wi-Fi interface.

10. The communication network of claim 1, wherein the wireless millimeter-wave dual-ring network topology includes one or more wireless links between the nodes, each of the wireless links having a frequency above 50 GHz.

11. The communication network of claim 1, wherein wireless millimeter-wave dual-ring network topology includes one or more wireless links between the nodes, each of the wireless links having frequency band selected from the group consisting of E-Band and V-Band.

12. The communication network of claim 1, wherein the dual-ring network topology includes at least two rings operating at different data bandwidths from each other.

13. A method of wireless communication, comprising:
   transmitting data between a plurality of network nodes with wireless millimeter-wave beams, the nodes being configured into a dual-ring network operating at one or more millimeter-wave frequencies, wherein at least one of the nodes is configured to send and receive millimeter-wave beams through an obstruction that attenuates the millimeter-wave beams;

transmitting, from a first network node included in the plurality of network nodes, one or more first millimeter-wave beams through the obstruction with a first configurable phased array antenna included in the first network node, the first phased array antenna configured to mitigate the effect of path loss experienced by the first millimeter-wave beams passing through the obstruction; and receiving, at a second configurable phased array antenna included in a second network node included in the plurality of network nodes, the first millimeter-wave beams having passed through the obstruction, the second phased array antenna configured to mitigate path loss experienced by the first millimeter-wave beams passing through the obstruction.

14. The method of claim 13, further comprising:

exchanging a first encryption key of a dual-key encryption scheme between the network nodes over a first ring of the dual-ring network; and exchanging a second encryption key of the dual-key encryption scheme between the network nodes over a second ring of the dual-ring network.

15. The method of claim 13, further comprising:

detecting a network link failure; and re-routing data from a first ring of the dual-ring network to a second ring of the dual-ring network upon detecting the network link failure.

16. The method of claim 13, wherein the nodes are configured into a wireless ring network having three or more rings.

17. The method of claim 13, wherein the wireless millimeter-wave dual-ring network includes one or more wireless links between the nodes, each of the wireless links having a frequency above 50 GHz.

18. The method of claim 13, wherein wireless millimeter-wave dual-ring network includes one or more wireless links between the nodes, each of the wireless links having frequency band selected from the group consisting of E-Band and V-Band.

19. The method of claim 13, wherein the obstruction is selected from the group consisting of a building wall, building floor, a building ceiling, a barrier, and any combination of the foregoing.

20. The method of claim 13, wherein the dual-ring network includes at least two rings operating at different data bandwidths from each other.

* * * * *